US009146038B2

(12) United States Patent
Cha

(10) Patent No.: US 9,146,038 B2
(45) Date of Patent: Sep. 29, 2015

(54) IMPACT AND/OR SOUND DEADENING HYDRONIC SUB-FLOORING PANEL AND RELATED SYSTEM AND METHOD

(71) Applicant: CODI GROUP, LLC, New York, NY (US)

(72) Inventor: Kyoungjoo Cha, New York, NY (US)

(73) Assignee: CODI GROUP, LLC, New York, NY (US)

( * ) Notice: Subject to any disclaimer, the term of this patent is extended or adjusted under 35 U.S.C. 154(b) by 0 days.

(21) Appl. No.: 14/300,183

(22) Filed: Jun. 9, 2014

(65) Prior Publication Data

US 2014/0367477 A1    Dec. 18, 2014

Related U.S. Application Data

(60) Provisional application No. 61/834,384, filed on Jun. 12, 2013.

(51) Int. Cl.
*F24D 3/16* (2006.01)
*F24D 3/14* (2006.01)
*E04F 15/024* (2006.01)
*E04B 5/48* (2006.01)

(52) U.S. Cl.
CPC .......... *F24D 3/146* (2013.01); *E04F 15/02464* (2013.01); *F24D 3/16* (2013.01); *E04B 5/48* (2013.01); *F24D 3/145* (2013.01)

(58) Field of Classification Search
CPC .......... F24D 3/14; F24D 3/145; F24D 3/148; F24D 3/16; F24D 3/142; E04B 5/48
USPC ............ 237/69; 165/53, 56, 168, 169; 432/31
See application file for complete search history.

(56) References Cited

U.S. PATENT DOCUMENTS 4,508,162 A * 4/1985 Radtke ............................ 165/56
4,646,814 A * 3/1987 Fennesz ......................... 165/56

(Continued)

FOREIGN PATENT DOCUMENTS

CN    201041384 Y    3/2008
CN    202792187 U    3/2013

(Continued)

OTHER PUBLICATIONS

"WO_9110866_A1_M—MachTrans.pdf"; Machine translation of WO-9110866; httpa://www.epo.org; Oct. 31, 2014.*

(Continued)

*Primary Examiner* — Gregory Huson
*Assistant Examiner* — Daniel E Namay
(74) *Attorney, Agent, or Firm* — Christie, Parker & Hale, LLP

(57) ABSTRACT

A sub-flooring panel with improved impact and/or sound deadening (ISD) properties that is adapted to adjoin other sub-flooring panels to form a sub-flooring panel assembly, includes a base body having an upper surface formed with a groove for receiving a heating/cooling element, such as hydronic piping. A sub-flooring system with significantly improved ISD properties includes the panel assembly and an underlayment assembly which comprises a plurality of stabilizing supports, each support being adjustable in height, to support at least a generally rigid board and a fiberboard on which finishing flooring or laminate may be installed.

18 Claims, 22 Drawing Sheets

(56) References Cited

U.S. PATENT DOCUMENTS

| | | | | |
|---|---|---|---|---|
| 4,683,941 A * | 8/1987 | Timmer et al. | | 165/47 |
| 5,078,203 A * | 1/1992 | Shiroki | | 165/56 |
| 5,292,065 A * | 3/1994 | Fiedrich | | 237/69 |
| 5,454,428 A * | 10/1995 | Pickard et al. | | 165/49 |
| 5,492,756 A | 2/1996 | Seale et al. | | |
| 5,579,996 A * | 12/1996 | Fiedrich | | 237/69 |
| 5,871,151 A * | 2/1999 | Fiedrich | | 237/69 |
| 5,879,491 A * | 3/1999 | Kobayashi | | 156/71 |
| 5,931,381 A * | 8/1999 | Fiedrich | | 237/69 |
| 5,957,378 A * | 9/1999 | Fiedrich | | 237/69 |
| 6,152,377 A * | 11/2000 | Fiedrich | | 237/69 |
| 6,182,903 B1 * | 2/2001 | Fiedrich | | 237/69 |
| 6,220,523 B1 * | 4/2001 | Fiedrich | | 237/69 |
| 6,270,016 B1 * | 8/2001 | Fiedrich | | 237/69 |
| 6,283,382 B1 * | 9/2001 | Fitzemeyer | | 237/69 |
| 6,330,980 B1 * | 12/2001 | Fiedrich | | 237/69 |
| 6,533,185 B1 * | 3/2003 | Muir | | 237/69 |
| 6,726,115 B1 * | 4/2004 | Chiles et al. | | 237/69 |
| 6,739,097 B1 * | 5/2004 | Rodin | | 52/71 |
| 6,776,222 B2 * | 8/2004 | Seki et al. | | 165/56 |
| 7,021,372 B2 * | 4/2006 | Pickard | | 165/168 |
| 7,228,886 B2 * | 6/2007 | Seki et al. | | 165/56 |
| 8,028,742 B2 * | 10/2011 | Fiedrich | | 165/56 |
| 8,752,346 B1 * | 6/2014 | Shaw et al. | | 52/220.2 |
| 2003/0218075 A1 * | 11/2003 | Muir | | 237/69 |
| 2004/0026525 A1 * | 2/2004 | Fiedrich | | 237/69 |
| 2008/0083833 A1 * | 4/2008 | Blanke | | 237/69 |
| 2009/0014152 A1 * | 1/2009 | Foo et al. | | 165/56 |
| 2009/0314848 A1 * | 12/2009 | Andersson | | 237/71 |
| 2010/0237157 A1 * | 9/2010 | Guo | | 237/69 |
| 2011/0121087 A1 * | 5/2011 | Alstatt et al. | | 237/69 |

FOREIGN PATENT DOCUMENTS

| | | | | |
|---|---|---|---|---|
| DE | 3411339 A1 * | 10/1985 | | F24D 19/02 |
| DE | 10307686 A1 * | 9/2004 | | F24D 3/12 |
| EP | 1726738 A2 | 11/2006 | | |
| EP | 2402664 A2 * | 1/2012 | | F24D 3/16 |
| JP | 60164139 A * | 8/1985 | | F24D 3/14 |
| JP | 02008628 A * | 1/1990 | | F24D 3/16 |
| JP | 02161223 A * | 6/1990 | | F24D 3/16 |
| JP | 03020536 A * | 1/1991 | | F24D 3/16 |
| JP | 06058565 A * | 3/1994 | | F24F 1/00 |
| JP | 11270862 A * | 10/1999 | | |
| JP | 2003322349 A | 11/2003 | | |
| JP | 2011173576 A | 9/2011 | | |
| WO | WO 9110866 A1 * | 7/1991 | | F24D 3/14 |

OTHER PUBLICATIONS

International Search Report and Written Opinion dated Oct. 10, 2014 for International Application No. PCT/US2014/041791, 17 pgs.

* cited by examiner

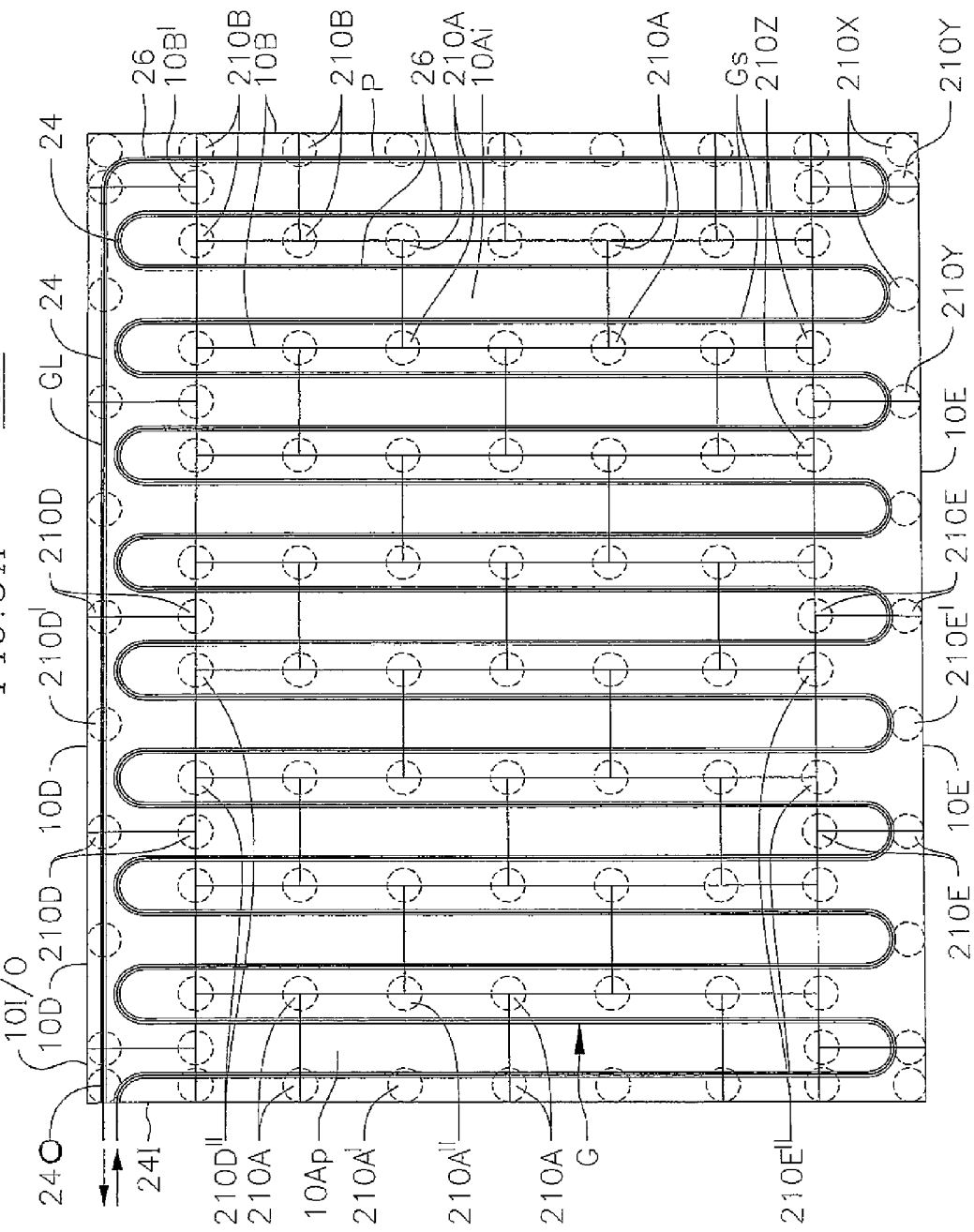

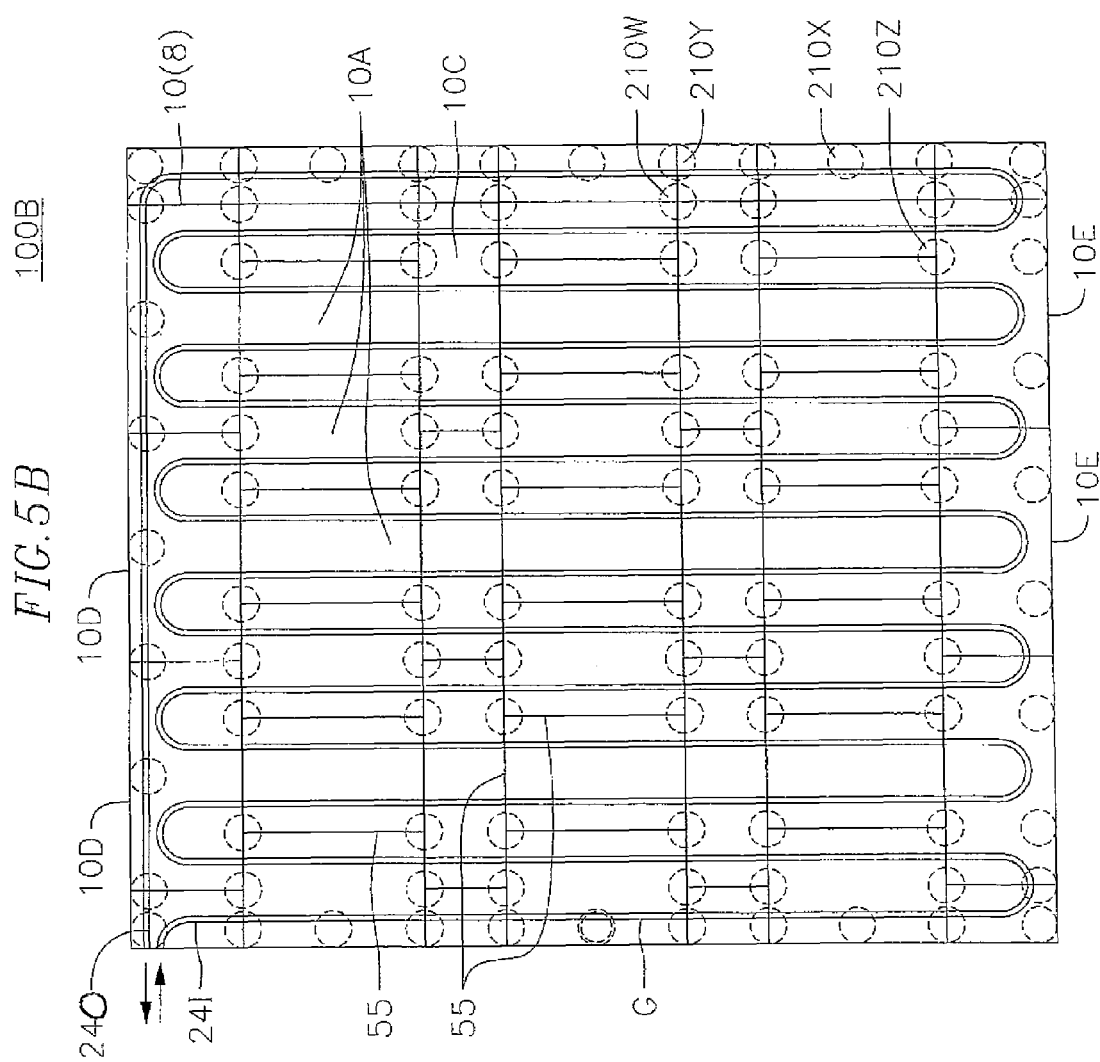

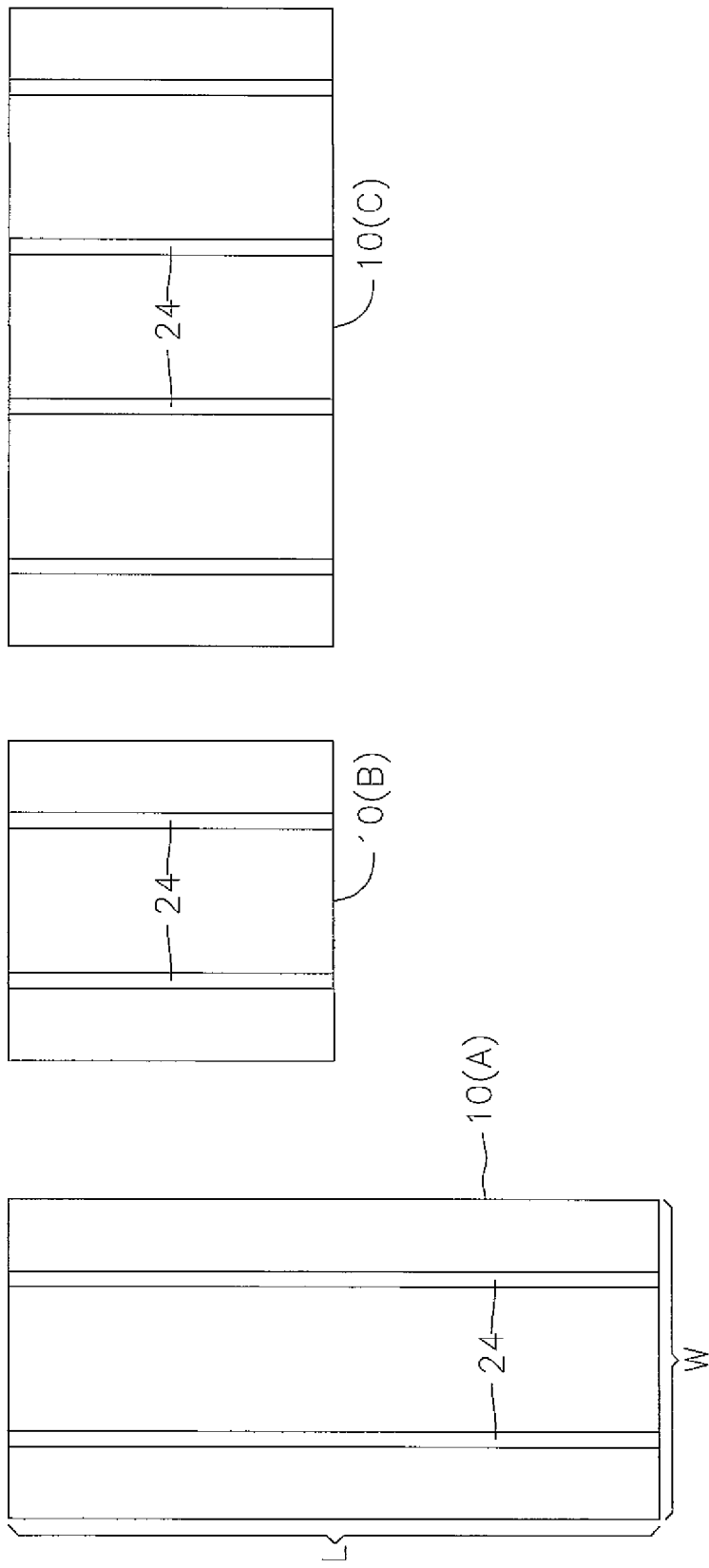

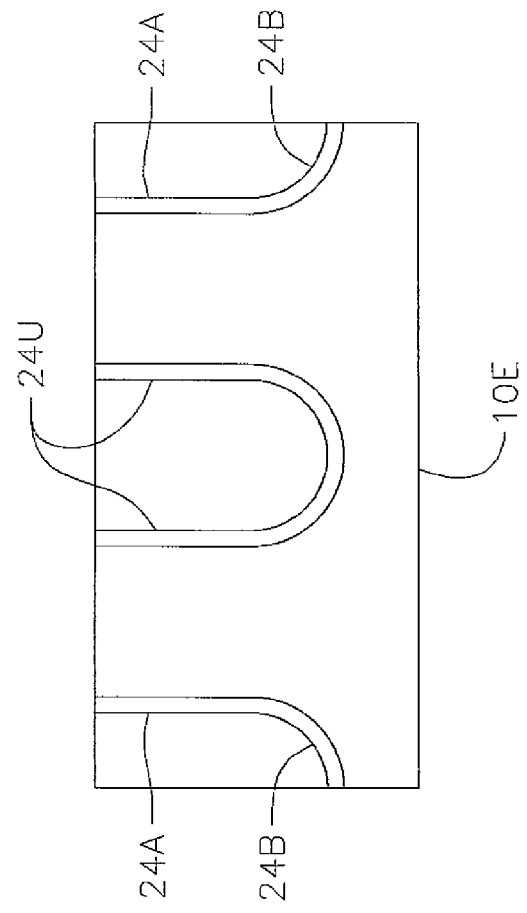
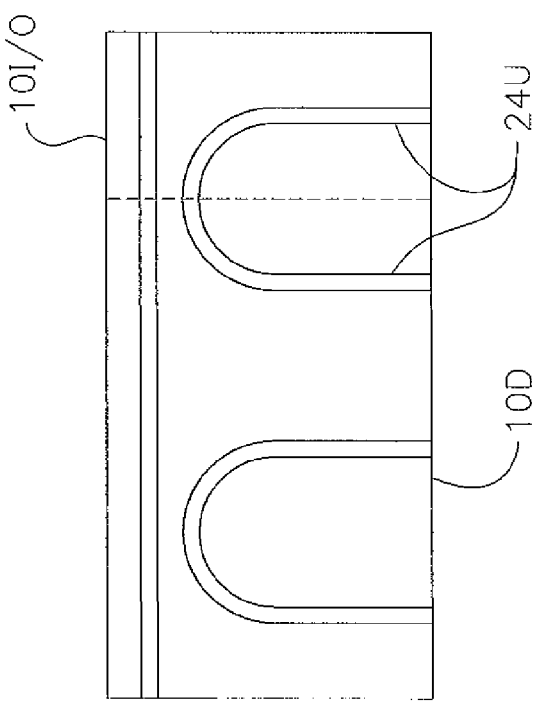

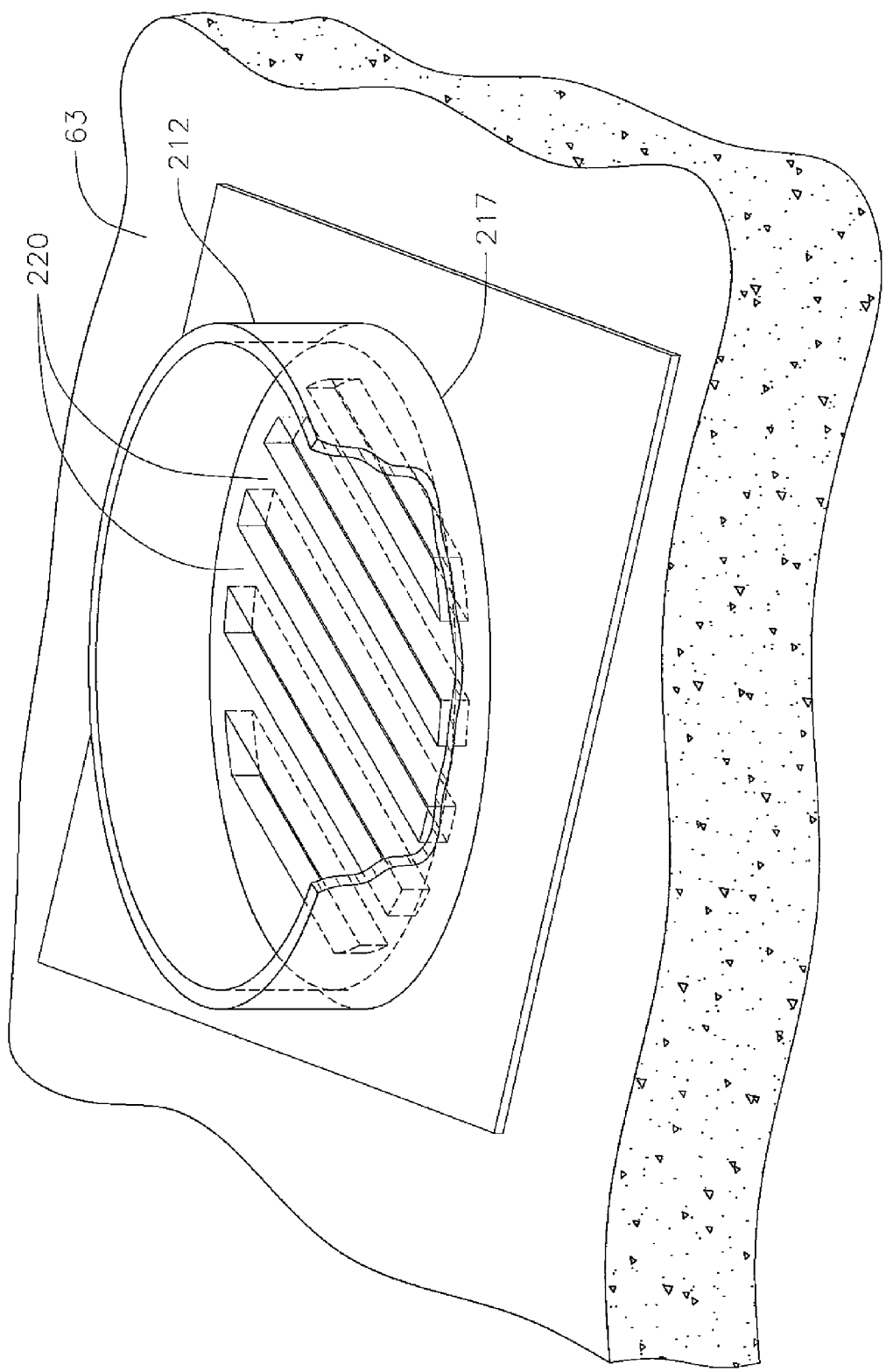

IMPACT AND/OR SOUND DEADENING HYDRONIC SUB-FLOORING PANEL AND RELATED SYSTEM AND METHOD

CROSS REFERENCE TO RELATED APPLICATION

This application claims priority to and the benefit of provisional U.S. Patent Application No. 61/834,384 filed Jun. 12, 2013, the entire content of which is incorporated herein by reference.

FIELD OF INVENTION

The present invention relates to sub-flooring systems and related methods, including heating (and/or cooling) sub-flooring systems and methods applying hydronics and hydronic structures.

BACKGROUND OF INVENTION

An "ondol" is an underfloor heating system used in traditional Korean architecture. The system typically included a cooking fire or stove in a kitchen that was surrounded by one or more rooms of the house built on a raised masonry floor two or three feet higher than the kitchen. Extending through the raised masonry floor were horizontal smoke passages that led to a standing chimney providing a draft through the passages. Heat from the fire or stove would travel through the horizontal smoke passages to heat the rooms of the house. The horizontal smoke passages were usually covered by stone slabs, clay or concrete, which formed the heated floor of the rooms, and a water-impervious layer, such as oiled paper, which formed the finished flooring on the heated floor.

It is appreciated that an efficient ondol system required a delicate balance between two conflicting factors. On the one hand, for fuel to burn well in the fire or stove, the passages should provide good air flow from the fire to the chimney. On the other hand, for effective heating of the rooms, hot air should linger in the passages as long as possible to warm the stone slabs, clay or concrete forming the heated floor. To accomplish this, the passages were lengthened for multiple passes under each room, thus preventing the hot air from exiting through the chimney too quickly. When the correct balance was achieved, a room could be kept warm all night by the stone slabs, clay or concrete heated by a fire that lasted only a couple of hours.

Evolution of Korean architecture led to multi-story housing and improved ondol systems. However, flue gases from burning wood or coal caused many deaths from carbon monoxide poisoning. As a result, flue gas systems have given way to electric heating elements and/or piping circulating heated water (or "hydronics").

In a "poured floor" or "wet floor" system, electric heating elements or hydronic piping extend through a "light" (more porous) concrete floor that is poured above a concrete slab. The wet floor system has many drawbacks, including the 15-20 day curing period for both layers of concrete, the upper layer of which cannot be poured until the lower layer has completely cured. The curing period can also be extended significantly if the concrete is poured during rainy or winter season. In cold climate, the concrete can even freeze.

After curing, the concrete can absorb water which can significantly increase its weight and evaporate during warmer weather causing the finishing flooring or laminate to buckle and warp. Moreover, in high-rise buildings and multi-story residential buildings, concrete can create poor acoustics as sound and impact waves can travel through concrete between floors and echo throughout the building. In that regard, while impact and/or sound may involve different physical events with different physical effects, impact and/or sound deadening are used interchangeably and collectively herein as "impact and/or sound deadening" or "ISD."

Laying a sub-floor and piping in a "poured floor" or "wet floor" system is labor and time intensive. Different stages of construction and installation of a poured or wet floor system require time, scheduling and a team of professional workers with an array of different skills and experience. If any part of the subfloor, piping or heating element in a "poured floor" or "wet floor" system is subsequently damaged, the concrete subfloor of the entire room or area must be cracked and removed in order to access and replace the damaged piping or heating element. The concrete subfloor must then be repoured over the replacement piping or heating element.

Accordingly, there is a need for a heating and/or cooling sub-flooring system which advantageously uses hydronics or hydronic principles for thermal conduction while minimizing or avoiding entirely the use of concrete. It is desirable that such sub-flooring system be easy to install, in terms of labor, time and the skills required of workers whether or not they are trained professionals. It is further desirable that such sub-flooring system include environmentally-friendly components and that such sub-flooring system be adapted for use in multi-dwelling highrise buildings and multi-story residential buildings with significantly improved impact and/or sound deadening.

SUMMARY OF THE INVENTION

The present invention is directed to an ISD sub-flooring system, including a sub-flooring panel assembly and an underlayment assembly, that is environmentally-friendly and relatively inexpensive to manufacture and install in terms of material and labor. The sub-flooring system also provides significantly improved impact and/or sound deadening properties (collectively referred to herein as ISD properties).

A sub-flooring panel of the present invention is adapted to adjoin with other sub-flooring panels. The panel includes a base body having an upper surface formed with a groove for receiving a temperature control element, e.g., a hydronic heating and/or cooling piping adapted to pass fluid. The groove is lined with one or more thermally-conductive (TC) liners that come into contact with the piping after it is laid in the groove. The TC liners extend over surfaces of the base body for improving thermal transfer between the piping and the base body. A protective cap member covers the groove to protect the piping and provide a flat smooth surface generally continuous with the upper surface of the sub-flooring panel.

Each sub-flooring panel has side surfaces formed with tongue and groove connectors for releasably joining with adjacent sub-flooring panels to span an area. The sub-flooring panels are joined with the piping grooves aligned to form a predetermined groove pattern over the area so that a single continuous elongated piping can be placed in the grooves.

The underlayment assembly of the present invention includes layers of ISD material(s) and support structures, including stabilizing supports and at least one rigid board layer and at least one fiberboard layer. Depending on the layout of the sub-flooring panels, stabilizing supports are positioned at selected locations on a bottom slab structure, with the at least one rigid "balance" board and the at least one fiberboard positioned on the stabilizing supports. These layers may be affixed to each other by ISD adhesive and the like, and they may be affixed to the stabilizing supports by fasteners, such as screws or nails.

The stabilizing supports are advantageously portable, and adjustable in height for supporting the structures above it at any desired horizontal level, for example, to compensate for any tilting or unevenness of the bottom slab structure. Each stabilizing support has a tubular member containing a non-compressible, volume-filling particulate substance, and a piston inserted in the tubular member and resting on the surface of the particulate substance. The stabilizing supports further include ISD cushion pads and/or liners. The stabilizing supports also significantly increase the ISD properties of the underlayment assembly by providing a noncompressible layer of space that can both bear the weight load of the structures above while allowing the layer to be filled with a loose, volume-filling ("LVF") substance with ISD properties, for example, natural fiber chips.

The present invention also includes methods of installing a sub-flooring system having a sub-flooring panel assembly and an underlayment assembly. The methods include forming a sub-flooring panel assembly by joining a plurality of sub-flooring panels with their piping grooves aligned, providing TC liners in the grooves and elsewhere on the panels, resting a piping on overlying TC liners along perforations positioned above the grooves and pressing on the piping with sufficient force to tear the perforations and drop into the grooves. Before the piping is laid in the grooves, an underlying TC liner may be placed in the groove or be wrapped on the piping so that the underlying TC liner accompanies the piping into the groove. With the piping installed in the grooves having direct and indirect contact with the overlapping TC liners, thermal transfer between the piping and the base body of the panel is increased.

The methods also include installing the underlayment assembly prior to installing the sub-flooring panel assembly. Installing the underlayment assembly includes installing and assembling stabilizing supports at selected locations on a slab structure relative to layouts of the sub-flooring panels, balance boards and/or fiberboards, for example, under their corner areas. Tubular members of the supports are affixed to their respective selected locations on the slab structure. The particulate substance is placed in the tubular members. The pistons are inserted into their respective tubular members and positioned on the particulate substance in the tubular members. The height of each piston is advantageously adjustable by methods including increasing or decreasing the amount of particulate substance contained in its respective tubular member, adding or removing ISD pads, and/or replacing the piston with a taller or shorter piston. The balance boards and/or fiberboards are placed on the stabilizing supports, followed by the assembly of sub-flooring panels.

BRIEF DESCRIPTION OF THE DRAWINGS

These and other features and advantages of the present invention will be better understood by reference to the following detailed description when considered in conjunction with the accompanying drawings wherein:

FIG. 5A is a top plan view of a sub-flooring panel assembly of the present invention, in accordance with an embodiment, shown with an overall resulting groove pattern and a piping received therein.

FIG. 5B is a top plan view of a sub-flooring panel assembly of the present invention, in accordance with another embodiment, shown with an overall resulting groove pattern.

FIG. 7 is a top plan view of a sub-flooring panel of the present invention, in accordance with one embodiment.

FIG. 8 is a top plan view of a sub-flooring panel of the present invention, in accordance with another embodiment.

FIG. 9 is a top plan view of a sub-flooring panel of the present invention, in accordance with another embodiment.

FIG. 10 is a top plan view of a sub-flooring panel of the present invention, in accordance with another embodiment.

FIG. 11 is a top plan view of a sub-flooring panel of the present invention, in accordance with another embodiment.

FIG. 14A is a perspective view of a tubular member of the stabilizing support of FIG. 14, in accordance with another embodiment, with a portion broken away for clarity.

DETAILED DESCRIPTION OF THE INVENTION

ISD Sub-Flooring Panel

Figure 1:
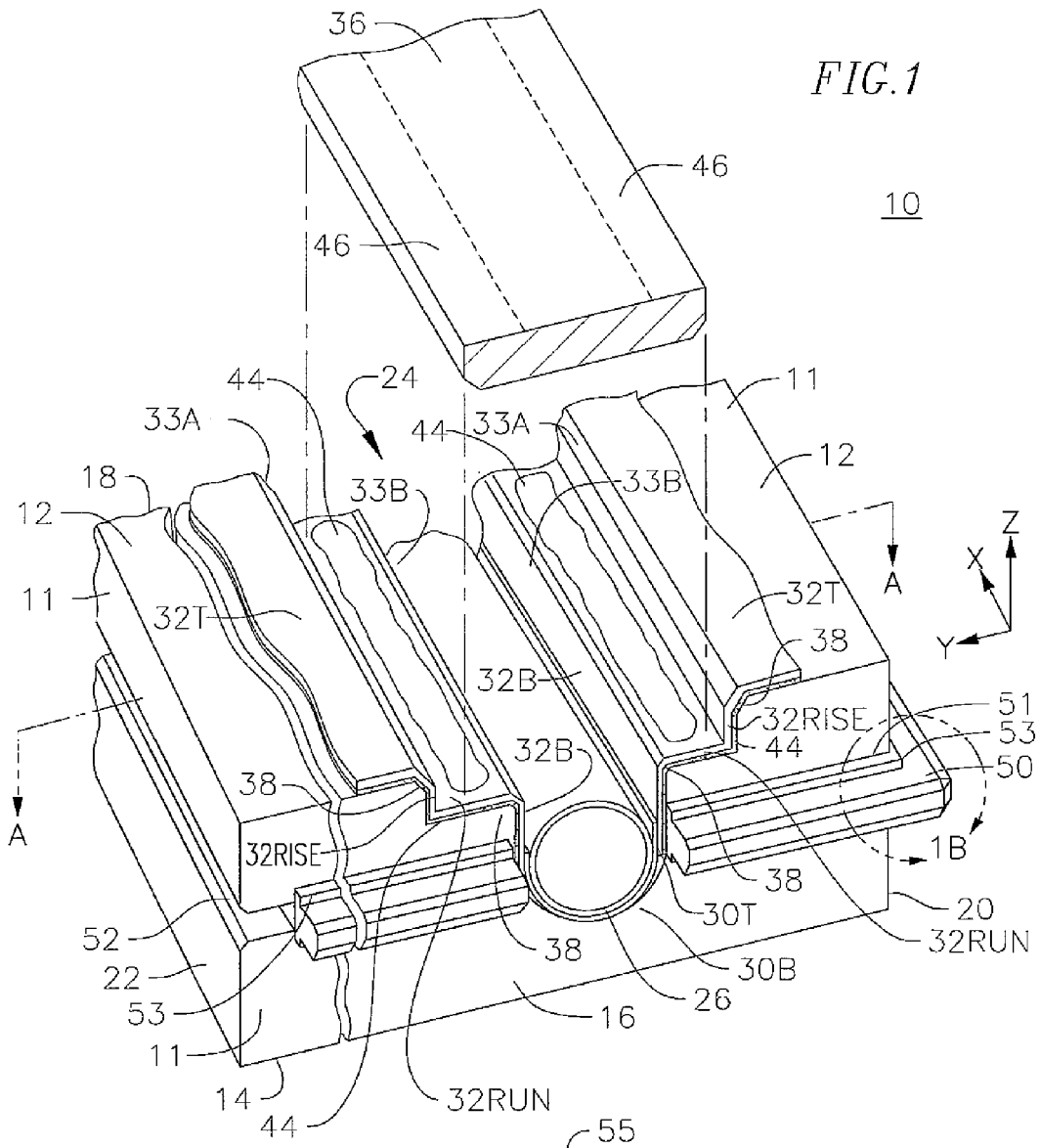
FIG. 1 is a partially-exploded perspective view of a sub-flooring panel, with a portion of piping and a protective cap member, of the present invention, in accordance with one embodiment.
Figure 2:
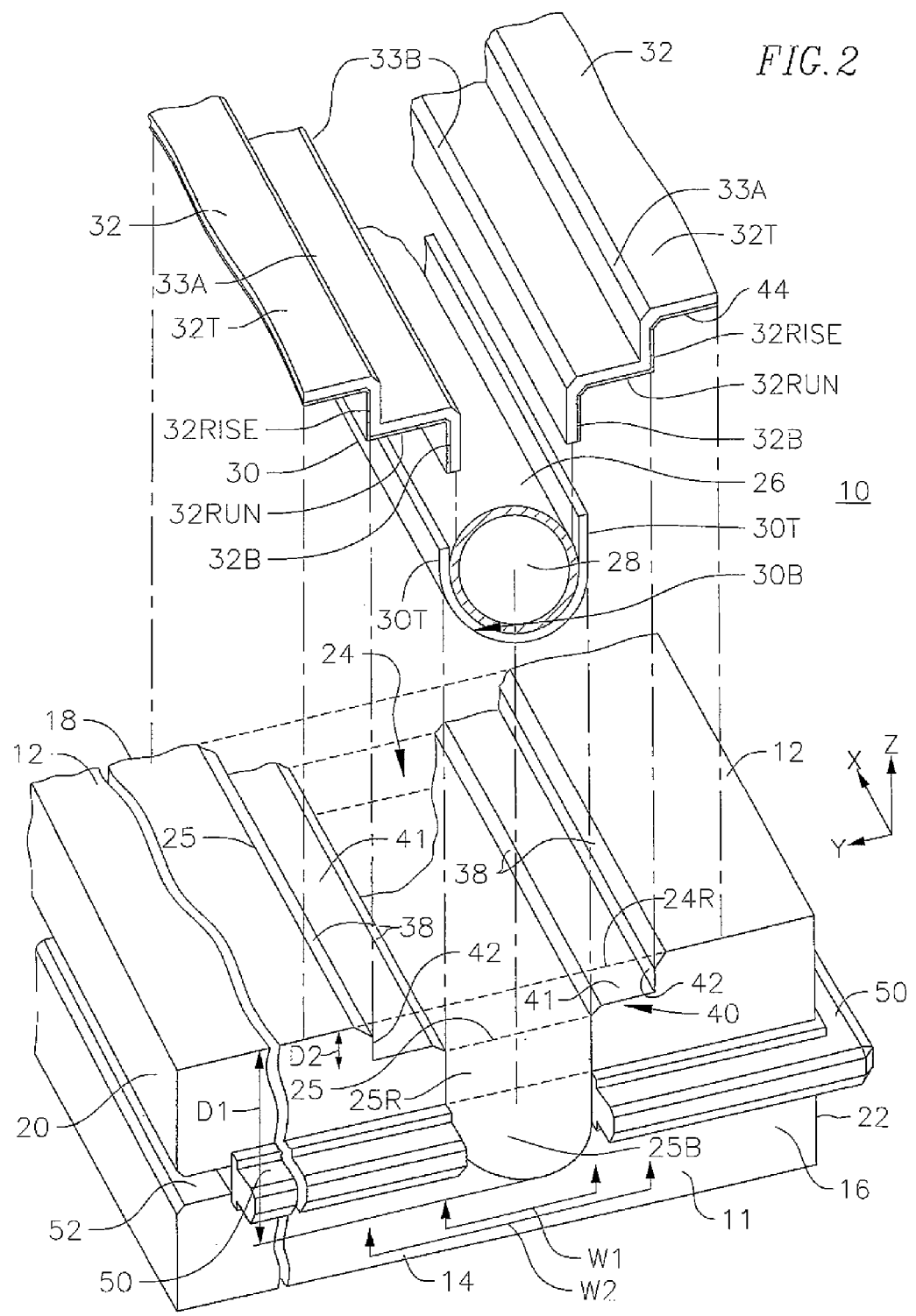
FIG. 2 is another partially-exploded perspective of the sub-flooring panel of FIG. 1
Figure 3:
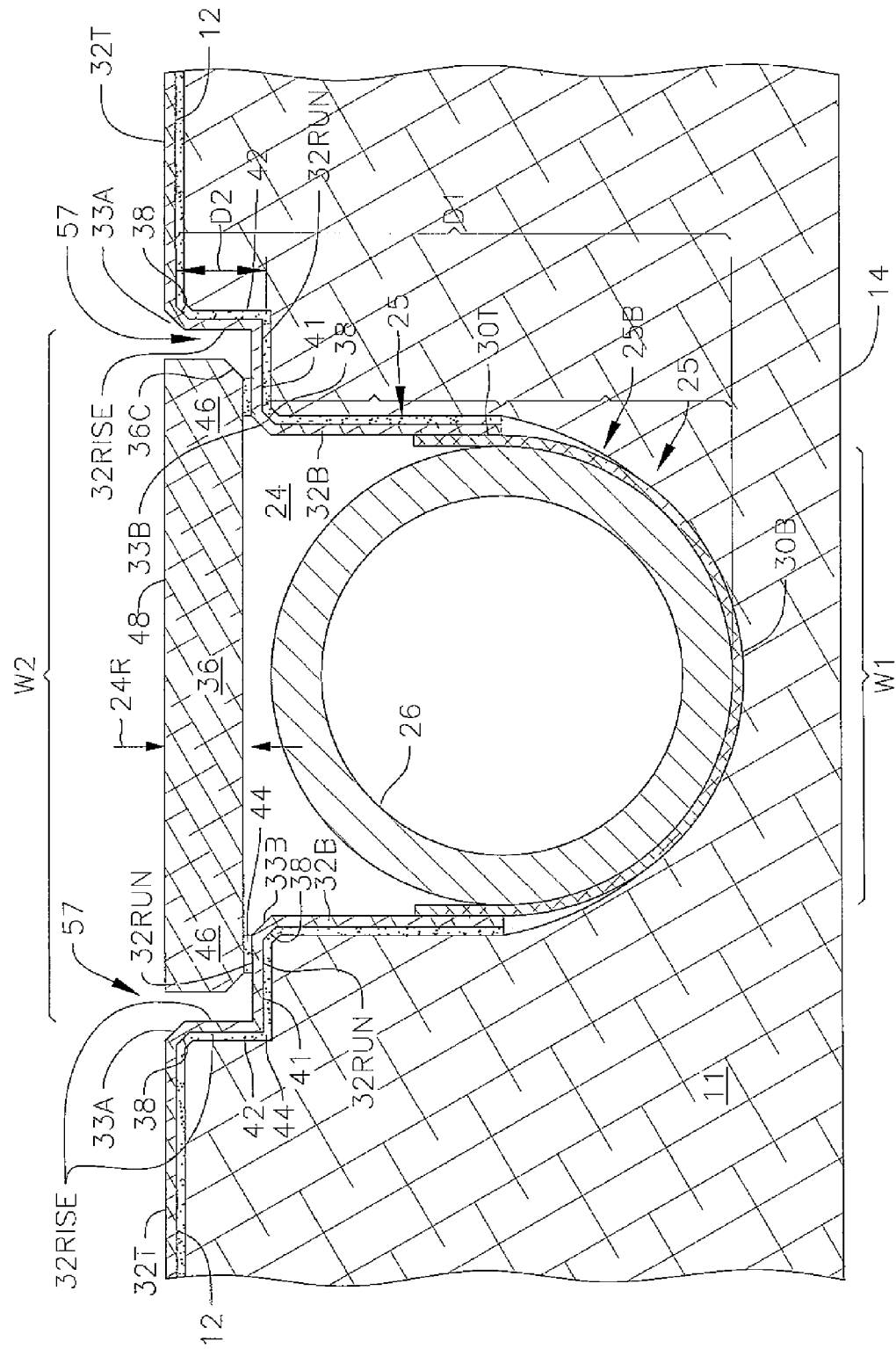
FIG. 3 is an end cross-sectional view of the sub-flooring panel of FIG. 1, taken along line A-A.

FIGS. 1, 2 and 3 illustrate an embodiment of a ISD sub-flooring hydronic panel 10 adapted to provide temperature control, including radiant heat, into a room or an area lined with a plurality of sub-flooring hydronic panels on which finishing flooring or laminate may be laid. The sub-flooring panel 10 is shown with portions broken and not necessarily to scale to facilitate a description thereof, as follows. The panel 10 has a base body 11 which is generally rectangular and has dimensions extending in the x, y and z directions. The body 11 has a plurality of surfaces, including an upper surface 12 and a lower surface 14, each in an x/y plane, a front surface 16, and a back surface 18 (not shown), each in a y/z plane, and two side surfaces 20 and 22, each in an x/z plane. The body 11 may be constructed of any suitable material that is thermally-conductive and load-bearing, for example, oriented strand board (OSB), plywood, medium density fiberboard (MDF), particleboard, pre-fabricated agricultural residues, wood, pre-fabricated "light" concrete, plastics or any combinations thereof. As understood by one of ordinary skill in the art, OSB is an engineered wood formed by layering strands (flakes) of wood in specific orientations. OSB has high mechanical properties which make it suitable for load-bearing applications in construction.

On the upper surface 12 of the body 11, an elongated recessed formation or piping groove 24 is provided. In the illustrated embodiment of FIGS. 1, 2 and 3, the groove 24 has multiple and at least two different depths in the z-axis so as to allow a variety of components, including heating and/or cooling components to be situated within the groove 24 generally below the plane of the upper surface 12. Such components include, for example, a heating element such as a flexible electric heating cord or a flexible hydronic piping 26 for passing heated fluid through a lumen 28, and a protective filler or cap member 36. These components are laid in the aligned grooves 24 of a plurality of adjoined flooring panels 10 spanning the room or an area. One or more thermally-conductive (TC) sheet liners are placed in direct contact with the piping 26 to improve the thermal transfer throughout the panel 10. In the illustrated embodiment, a first underlying TC liner 30 lines the groove 24, and first and second overlying TC liners 32 line a respective side of the groove and the upper surface 12. Each of the three TC liners is in physical contact with a portion of the piping 26, and each of the overlying liner 32 is in contact with the underlying liner 30.

With reference to FIG. 2, the piping groove 24 has a first greater depth D1 with a lesser width W1, and a second lesser depth D2 with greater width W2 that spans on opposite sides of the groove 24. With the width W1 being less than the width W2, a step 40 is formed with a run 41 and a rise 42 on each side of the groove 24. The portion of the groove 24 below the run 41 forms the trough 25, whose cross-sectional shape and size correspond to those of the piping 26. In the illustrated embodiment, the cross-sectional shape of the piping 26 is circular, so the trough 25 has a bottom portion 25B with a semi-circular cross-sectional shape that conforms to the bottom of the piping 26. Such correspondence and conformity improve surface contact between the piping 26 and any liner lining the trough 25. The trough 25 has an unrestrictive (e.g., rectangular) cross-sectional top portion 25R so that the piping 26 can be easily lowered or dropped into the trough 25. In the illustrated embodiment, the depth D1 is greater than the outer diameter of the piping 26 and ranges between about 120% and 130%, and preferably about 125%, of the outer diameter of the piping 26. Above the trough 25, at the lesser depth D2 and with the greater width W2, the groove 24 also has a unrestrictive (e.g., rectangular) cross-sectional portion 24R, between the upper surface 12 and the trough 25.

As shown in FIGS. 1 and 2, lining the trough 25 is the underlying TC liner 30 which conforms to the trough 25 so that it has a semi-circular cross-sectional bottom portion 30B that advantageously conforms to a bottom portion of the piping 26. The TC liner 30 has a sufficient width such that it provides flat side portions 30T that extend upwardly along each side of the top portion 25T of the trough 25. The TC liner 30 may be affixed in the trough 25 by an ISD adhesive or glue, a layer or coating of which may be applied on the surface of the trough 25.

As also shown in FIGS. 1 and 2, each of the two overlying TC liners 32 (one on each side of the TC liner 30) has a bottom portion 32B, a run-portion 32RUN, a rise-portion 32RISE and a top portion 32T, delineated by a first elongated bend 33A between the portions 32RISE and 32T, and a second elongated bend 33B between the portions 32RUN and 32B. Each bend may be, for example, a right angle bend which conforms to a respective corner 38 on each side of the groove 24 above and below the run 41 and rise 42. Each bottom portion 32B of the overlying TC liner 32 advantageously contacts (by overlying or underlying) a respective top flat side portion 30T of the underlying TC liner 30 for direct heat transfer from the underlying TC liner 30 to each overlying TC sheet liner 32. Each run-portion 32RUN lies on a respective run 41 and each rise-portion 32RISE lies against a respective rise 42. Each top portion 32T lies on a respective portion of the upper surface 12 on opposite sides of the groove 24. The top portions 32T may cover only portions of the upper surface 12 or in its entirety, depending on the desire or need. ISD adhesive 44 or the like (FIG. 1) can be applied to the undersides of the TC liners 32 before the liners are applied and to the panel 10, or it can be applied to the run 41, the rise 42 and portions of the upper surface 12.

As illustrated in FIG. 1, each corner 38 in the piping groove 24 may be optionally beveled to minimize damage to overlying TC liners 32. Without beveling, the corners may pose the risk of tearing the overlying liners during panel installation and use. The folds 33A and/or 33B of overlying TC liners 32 may be rounded in conformity with the beveled corners 38.

Figure 4:
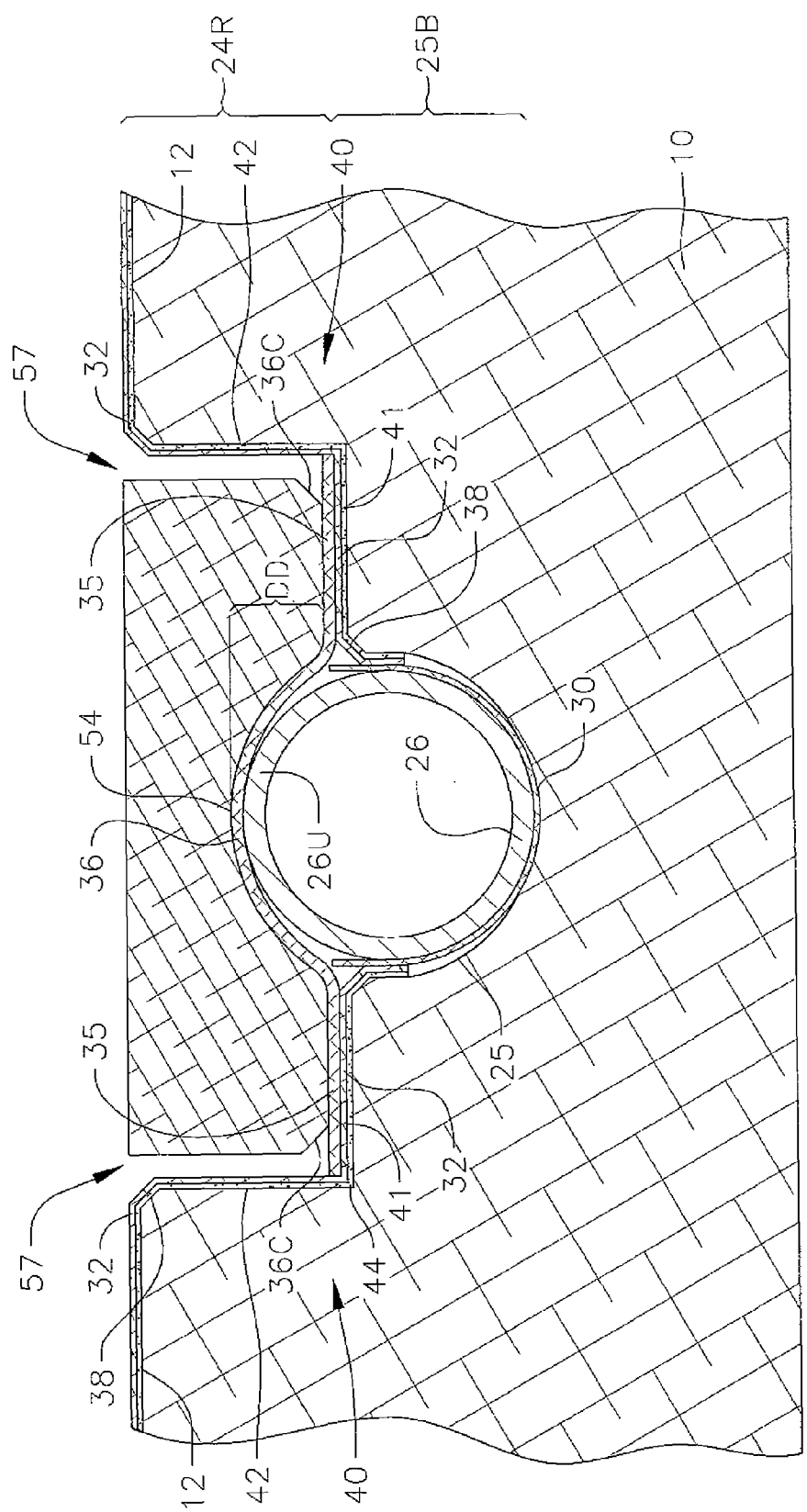
FIG. 4 is an end cross-sectional view of a sub-flooring panel, with a portion of piping and a protective cap member of the present invention, in accordance with another embodiment.

To fill in the top cross-sectional portion 24R of the groove 24 and protect the piping 26, the protective filler or cap member 36 with a generally conforming configuration to the top groove portion 24R is placed in the groove 24 with its side portions 46 resting on the rises 42 on each side of the groove 24. In the illustrated embodiment, the top groove portion 24R has a generally rectangular cross sectional configuration, so the cap member 36 also has a generally rectangular cross-sectional configuration. Moreover, the thickness of the cap member 36 is no greater and generally equal to the depth D2 so that a top surface 48 of the cap member is generally even and co-planar with the top surface 12 of the body 11. As shown in FIGS. 3 and 4, the cap member 36 has a width that is less than the width W1 of the groove 24, which provides small lateral space gaps 57 between it and the rises 42 on each side of the groove 24. The lateral gaps 57 accommodate any expansion and shrinkage of the cap member 36 and the body 11 due to temperature and humidity fluctuations so the cap member 36 can sit evenly on the runs 41 and not protrude above the upper surface 12 of the sub-flooring panel 10. Bottom corners 36C of the cap member 36 may be beveled to minimize damage to the overlying TC liners lining the groove 24. Adhesive 44 (FIG. 1) may be applied to affix cap member 36 to the runs 41, and/or a cushioning pad (FIG. 12A) may be applied between the cap member and the runs 42 to minimize the cap member rattling. It is understood that a protective cap member 36 may be placed in and occupy every groove 24 of an assembly of adjoined sub-flooring panels whether or not the groove 24 includes a piping 26.

The piping 26 may be constructed of any suitable material, for example, cross-linked polyethylene (PEX or PEX-AL-PEX), that is fluid-tight and can tolerate exposure to high or low temperatures of fluid passing therethrough and be thermally conductive. The TC sheet liners 30 and 32 may be constructed of any suitable material, for example, aluminum, copper, or any combinations thereof. It is understood that a single TC sheet liner may be used in place of the TC liners 30 and 32; however, installation of the single TC sheet liner into the groove 24 may require additional care and labor compared to installation of the TC sheet liners 30 and 32.

The cap member 36 may be constructed of any suitable material, for example, oriented strand board (OSB) medium-density fiberboard (MDF), particle board, plywood, pre-fabricated agricultural residues, plastics, wood, aluminum, or any combinations thereof. MDF is an engineered wood product formed by breaking down hardwood or softwood fibers into fiberboards, often in a defibrator, combining it with wax and a resin binder, and forming panels by applying high temperature and pressure. MDF is generally denser than plywood. It is made up of separated fibers, but can be used as a building material similar in application to plywood. It is typically stronger and much denser than particle board.

It is noted that the sub-flooring panel of FIG. 3 is shown with the piping 26 and the cap member 36 in place in the piping groove 24. That is, the piping and the cap member are typically placed in the piping groove 24 after the sub-flooring panel 10 has been installed in a room or an area and joined with other sub-flooring panels to form a sub-flooring panel assembly. In contrast, the sub-flooring panel of FIG. 1A illustrates a sub-flooring panel prior to receiving the piping 26 and the cap member 36. As shown, the overlying TC sheet liners 32 affixed to the upper surface 12 and straddling the piping groove 24 can be initially a single intact sheet with a series of perforations 61 generally centered over the groove 24. When the piping 26 is being laid in the piping groove 24, the piping 26 is pushed into the groove 24 which advantageously tears or otherwise separates the TC liner 32 along the perforation 61 into at least two pieces that line opposing sides of the groove 24. In contrast, the underlying TC liner 30 may be placed at the bottom of the trough 25 before the piping 26 is laid therein, or alternatively, the liner 30 may be wrapped on the bottom portion of the piping 26 before the piping is pushed into the groove 24 such that the piping and the underlying TC liner 30 are simultaneously laid in the trough 25.

As understood by one of ordinary skill in the art, the sub-flooring panel 10 may assume in a variety of shapes and sizes. The illustrated embodiment is of a panel 10 with a rectangular shape with a length L, a width W and a thickness T. In one embodiment, the length L may range between about 600 mm and 1,200 mm. The width W may range between about 300 mm and 600 mm. The thickness T may range between about 20 mm and 30 mm. In a more detailed embodiment, the panel 10 has a length L of about 1,200 mm, a width W of about 600 mm, and a thickness T ranging between about 20 mm and 30 mm. The measurements, especially, the width W, should be made with care, or the grooves 24 of adjoining sub-flooring panels will not be aligned. As such, the width W is preferably measured from one outer edge of the upper surface 12 to the opposing outer edge.

As for the piping groove 24, the depth D1 is about 20.0 mm, the depth D2 is about 4.0 mm, the width W1 is about 16.5 mm, and the width W2 is about 24.5 mm. The run 41 has a width of about 4.0 mm and the rise 42 has a width of about 4.0 mm. The piping 26 may have an outer diameter ranging between about 14.0 mm and 20.0 mm, and preferably about 16.0 mm. Each of the thermally-conductive sheet liner 30 and 32 has a thickness ranging between about 0.1 mm and 0.3 mm, and preferably a thickness of about 0.2 mm. The cap member 36 has a width less than the width W2, for example, of about 22.5 mm, so as to allow for expansion and shrinkage of materials due to temperature and humidity.

FIG. 4 illustrates another embodiment of the sub-flooring panel of the present invention, wherein the piping groove 24 includes its upper rectangular portion 24R and the bottom portion 25B of the trough 25 without the trough upper portion 25R, such that an upper portion of the piping 26U is above the trough bottom portion 25B, with the upper portion of the piping being above the runs 41. Moreover, a lower surface of the cap member 36 facing the piping 26 has a recessed formation 54 in which the upper portion of the piping 26 is received. The recessed formation 54 has a depth DD that is a percentage of the diameter of the piping 26. In the disclosed embodiment, the percentage ranges between about 20%-50%, and preferably between about 30% to 40%. The recessed formation 54 enables the cap member 36 to encase and conform to the upper portion of the piping 26 and reduce air gaps between the piping 26 and the cap member 36 thereby providing better conformity and contact between the lower surface of the cap member 36 and the piping 26 for greater thermal conduction from the piping 26 to the cap member 36, and any TC liner in between. In that regard, an additional or third TC sheet liner 35 is inserted between the piping 26 and the cap member 36, whereupon the liner 35 adopts a configuration that conforms to the convexity of the piping 26 and the concavity of the recessed formation 54. For thermal conduction throughout the sub-flooring panel, the TC liner 35 has a sufficient width dimension such that it spans across the piping 26 with excess opposing side portions to overlap at least a portion of the TC liners 32 lining the runs 41 on each side of the groove 24.

For any embodiments of the present invention, the sub-flooring panel 10 may further include a layer or coating of waterproofing or water-resistant sealant that is applied to the groove 24, including the trough 25, the rises 41 and the runs 42. The sealant may be also be applied to any other surfaces of the panel, including the upper, front, back and side surfaces 12, 14, 16, 18, 20 and 22, as needed or desired.

ISD Sub-Flooring Panel Assembly

In accordance with a feature of the present invention, a plurality of sub-flooring panels 10 may be joined along the front, back and side surfaces 12, 14, 16 and 18 to form an assembly 100 of sub-flooring panels, as shown in FIGS. 5A and 5B. In that regard, each of these surfaces may be provided with a feature that releasably joins adjacent sub-flooring panels. With reference to FIGS. 1 and 2, the sub-flooring panel provides "tongue-and-groove" connectors by having at least one side surface formed with a recessed groove connector 52 and at least another side surface formed with a protruding tongue 50, both of which may be coated with a lubricant.

Figure 1B:
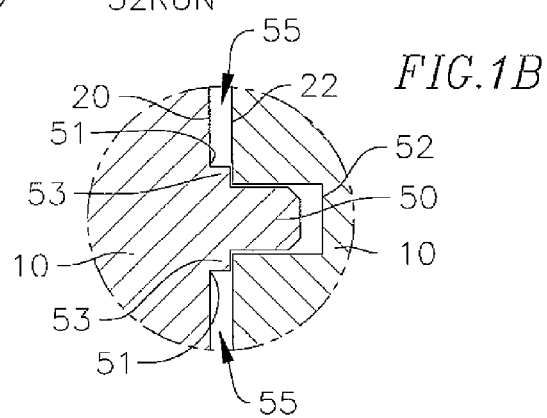
FIG. 1B is a detailed view of the sub-flooring panel, including a tongue member, of Section B in FIG. 1.
Figure 1A:
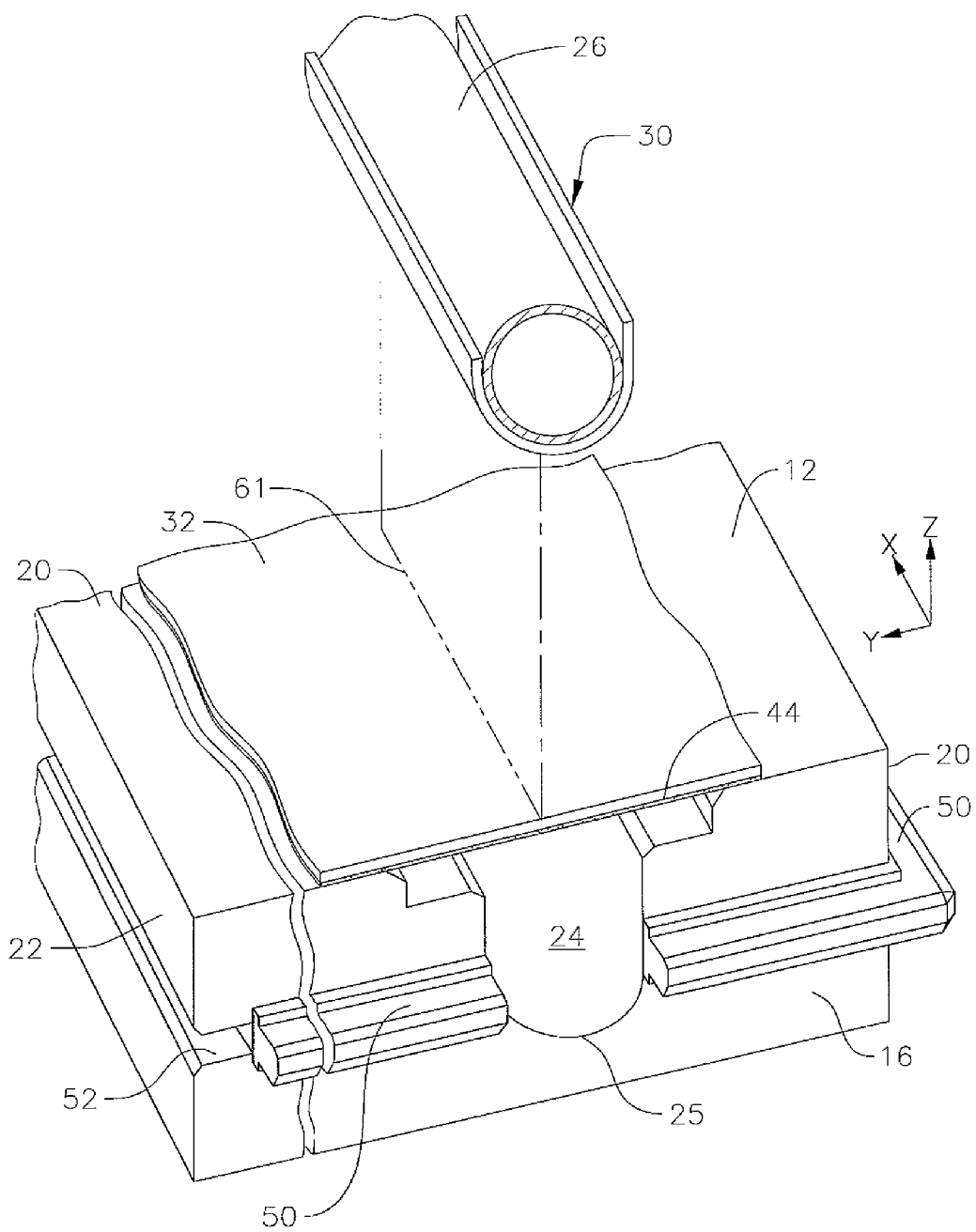
FIG. 1A is a partially exploded perspective view of the sub-flooring panel of FIG. 1 prior to receiving the portion of piping.

As shown in FIGS. 1 and 1B, the groove connector 52 extends along the back and side surfaces 16 and 22, and the tongue connector 50 extends along front surface 16 and the side surface 20, between upper and lower edges 51. Along one or both of the upper and lower edges 51, a mini-step "stop" formation 53 also extends along the front and side surfaces 16 and 20. The rise and run of the stop formation 53 is a fraction of the thickness of the tongue 42. In one embodiment, the fraction is between about 30% to 40%, preferably about 35%. The stop formation 53 provides a space gap 55 between the front, back and side surfaces 14, 16, 18, 20 and 22 of adjacent sub-flooring panels 10 to accommodate shrinkage and expansion of the sub-flooring panel due to temperature and humidity fluctuations which may otherwise cause the panels to abut and buckle against each other along their front, back and side surfaces and form an uneven floor surface.

Figure 6:
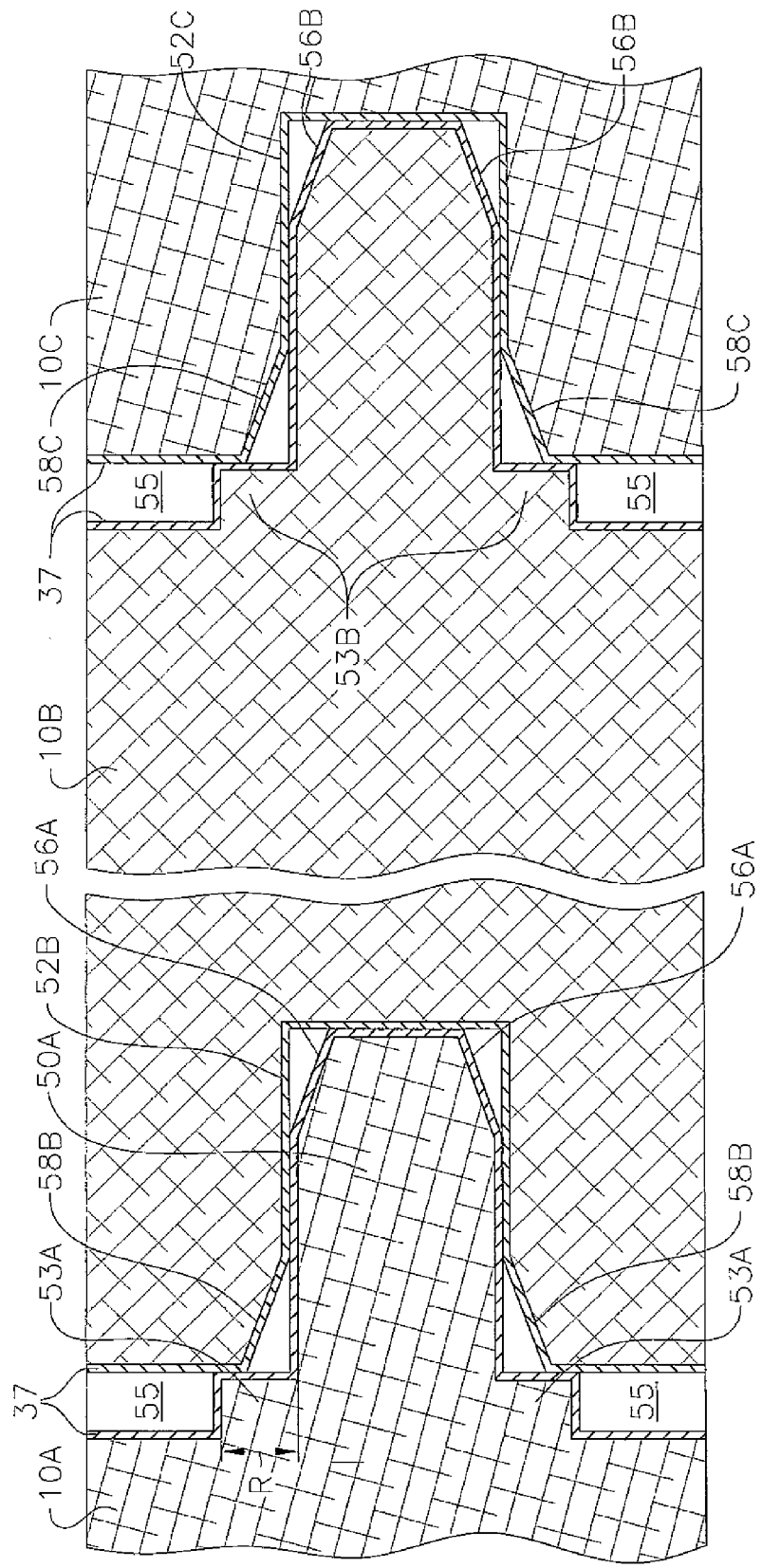
FIG. 6 is a side cross-sectional view of three adjoined sub-flooring panels forming a sub-flooring panel assembly of the present invention, in accordance with one embodiment.

FIG. 6 shows the tongue and groove connectors 50 and 52 in accordance with another embodiment, wherein three sub-flooring panels 10A, 10B and 10C are adjoined. The tongue connector 50A of panel 10A is engaged with and received in the groove connector 52B of adjacent panel 10B. Likewise, the tongue connector 50B of the panel 10B is engaged with and received in the groove connector 52C of adjacent panel 10C. As mentioned, the stop formations 53A and 53B of the tongue connectors 50A and 50B, respectively, provide the lateral gap 55 between the panels 10A and 10B and between the panels 10B and 10C. Notably, distal ends of tongue connectors 50A and 50B are beveled on their upper and lower edges 56A and 56B to facilitate insertion of the tongues connectors 50A and 50B, respectively, into the grooves connectors 52A and 52B, respectively. Likewise, the upper and lower outer edges 58A and 58B of the groove connectors 52A and 52B, respectively, are beveled. In that regard, the rise R of the stop formations 53 should be sufficiently large so that the stop formations 53 remain outside of the beveled edges 58A and 58B and the groove connectors 52A and 52B, respectively, so as to maintain the gaps 55 between the adjacent panels. Outer surfaces of the tongue and groove connectors 50A and 50B and 52A and 52B may be covered with a TC liner 37 that spans over the front, back and/or side surfaces 16, 18, 20 and/or 22.

For the sub-flooring panel assembly, the present invention includes sub-flooring panels of different configurations, each with two or more piping grooves 24 tracing predetermined patterns, for receiving different segment portions of an elongated, flexible piping 26. As shown in FIG. 7, sub-flooring panel 10A has a longitudinal rectangular configuration with two linear piping grooves 24 parallel with the longitudinal axis of the panel. As shown in FIG. 8, sub-flooring panel 10B has a generally square configuration, also with two linear piping grooves 24 parallel to a side of the panel. As shown in FIG. 9, sub-flooring panel 10C has a transverse rectangular configuration with four linear parallel piping grooves 24, all orthogonal to the longitudinal axis of the panel. As shown in FIG. 10, a sub-flooring panel 10D has a rectangular configuration with three piping grooves 24, two of which are nonlinear, and one of which is linear and parallel to the longitudinal axis of the panel. The two nonlinear grooves are each curved, for example, U-shaped, such that each leg 24U of the U-shaped grooves terminates at the same longitudinal edge of the panel. As shown in FIG. 11, a sub-flooring panel 10E has a rectangular configuration with three nonlinear piping grooves 24, one of which is curved as a U-shape, and two of which are curved as opposite halves of a U-shape. Both legs 24U of the U-shaped groove terminate at the same longitudinal edge, along with one leg each 24A of the half-U-shape groove, whereas the other legs 24B of the half-U-shape grooves terminates at opposite transverse edges.

Each of the foregoing sub-flooring panels has at least one piping groove 24 that can be covered by a respective protective cap member 36 (or portion thereof). The cap member 36 therefore has generally the same predetermined pattern (e.g., linear, curve, U-shape, etc.) as its piping groove 24.

In the embodiment of FIG. 5A, the sub-flooring panel assembly 100A comprises offset columns of the sub-flooring panels 10A and 10B that are bounded along two peripheries by the sub-flooring panels 10D (along the upper periphery) and sub-flooring panels 10E (along the lower periphery). In the alternate embodiment of FIG. 5B, a sub-flooring panel assembly 100B may comprises rows of the panels 10A, alternating with rows of the panels 10C, that are similarly bounded along two peripheries by the sub-flooring panels 10A and 10B.

By combining selected sub-flooring panels 10A-10E and any other sub-flooring panels, a variety of sub-flooring panel assemblies can be formed, each with a continuous groove G adapted to receive an elongated, flexible piping 26. It is understood that inlet/outlet subflooring panel 10I/O for the ingress/egress of a piping into a room or area can be "customized" by using a selected portion of any of the foregoing sub-floor panels 10A, 10B, 10C, 10D or 10E. Moreover, "customizing" a sub-flooring panel with additional inlet/outlet grooves may be performed by workers as needed or desired during installation. Thus, for a room or area of any size or shape, the temperature thereof can be affected or controlled by a sub-flooring panel system 100 of the present invention adapted to receive one or more piping(s) 26 that are laid in the grooves 24 of the sub-flooring panels 10. In both FIGS. 5A and 5B, the overall resulting pattern traced by the connected grooves of the sub-flooring panel assembly has a serpentine portion GS and a linear portion GL, where the inlet and outlet grooves 24I and 24O are formed on one corner panel 10I/O, which can be formed by using, for example, about a quarter portion of the side (right of FIG. 10) of the panel 10D.

Manufacture of ISD Sub-Flooring Panel

With reference to FIGS. 1 and 2, the sub-flooring panel body 11 is formed with an appropriate shape and size having a desired length, width and thickness. The panel 10 with the piping groove 24 (with depths D1, D2 and widths W1 and W2), the tongue and groove connectors 50 and 52 are formed, e.g., by milling, drilling, CNC routing, press-molding, etc. The coating of ISD adhesive 44 or the like may be applied to the TC liners 32 before their affixation to the panel body 11, or it may be applied on portions of the upper surface 12 and/or the rises 42 and runs 41 of the body 11. The overlying liner 32 with perforation(s) 61 is positioned and fixed (e.g., laminated) on the upper surface 12 such that the TC liner 32 straddles the groove 24 and the perforations are generally longitudinally aligned with the groove 24. In one embodiment, the TC liner 32 remains intact as a single sheet through installation of the sub-flooring panel with other adjoined sub-flooring panels to form a sub-flooring assembly that spans an area, until the piping 26 is installed in the grooves 24 of the adjoined sub-flooring panels. Where it is desired that the TC liner(s) 30 and/or 32 line the groove 24 prior to installation of the piping 26, the TC liners may be stamped into the groove 24 manually or by machine.

ISD Underlayment Assemblies

Figure 12A:
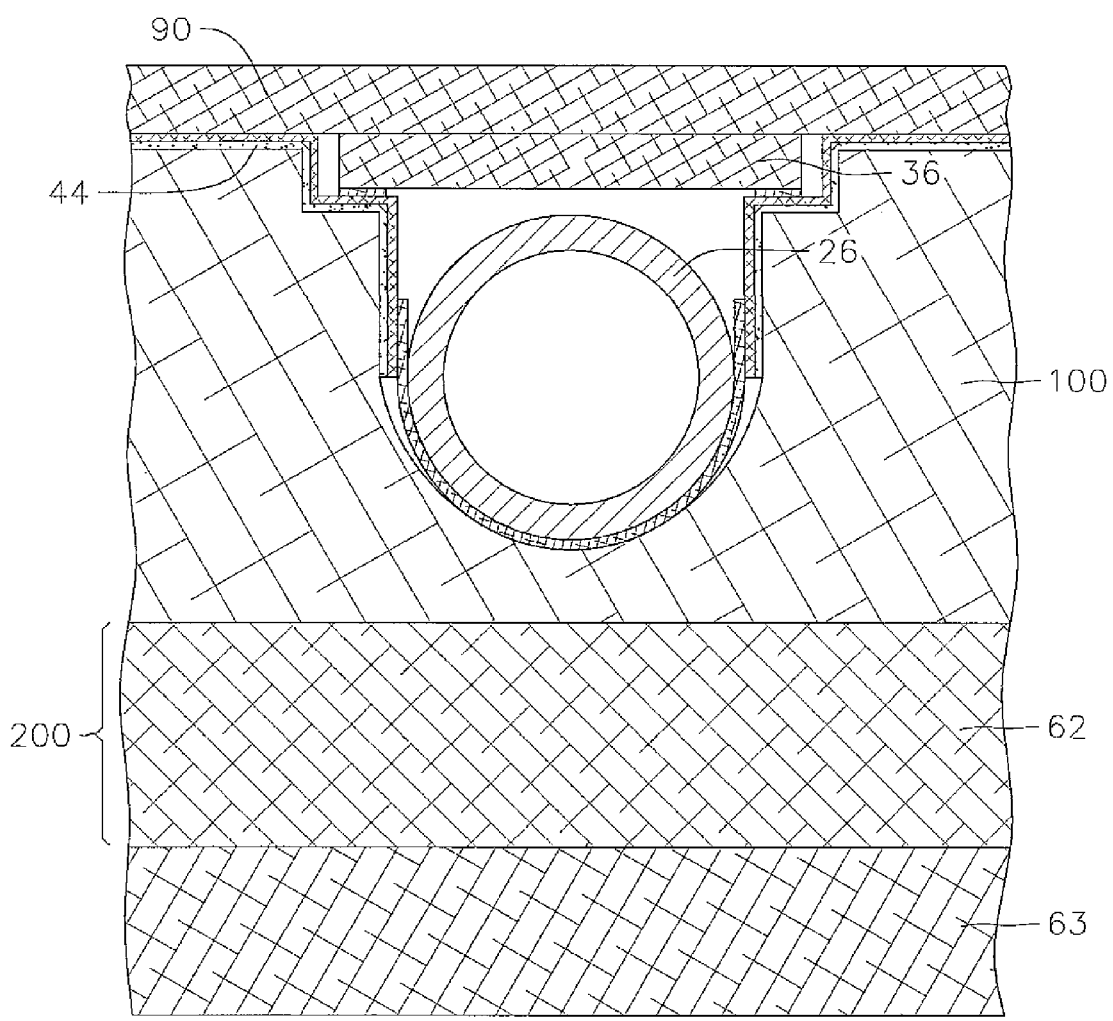
FIG. 12A is an end cross-sectional view of a sub-flooring system of the present invention, in accordance with an embodiment.
Figure 12B:
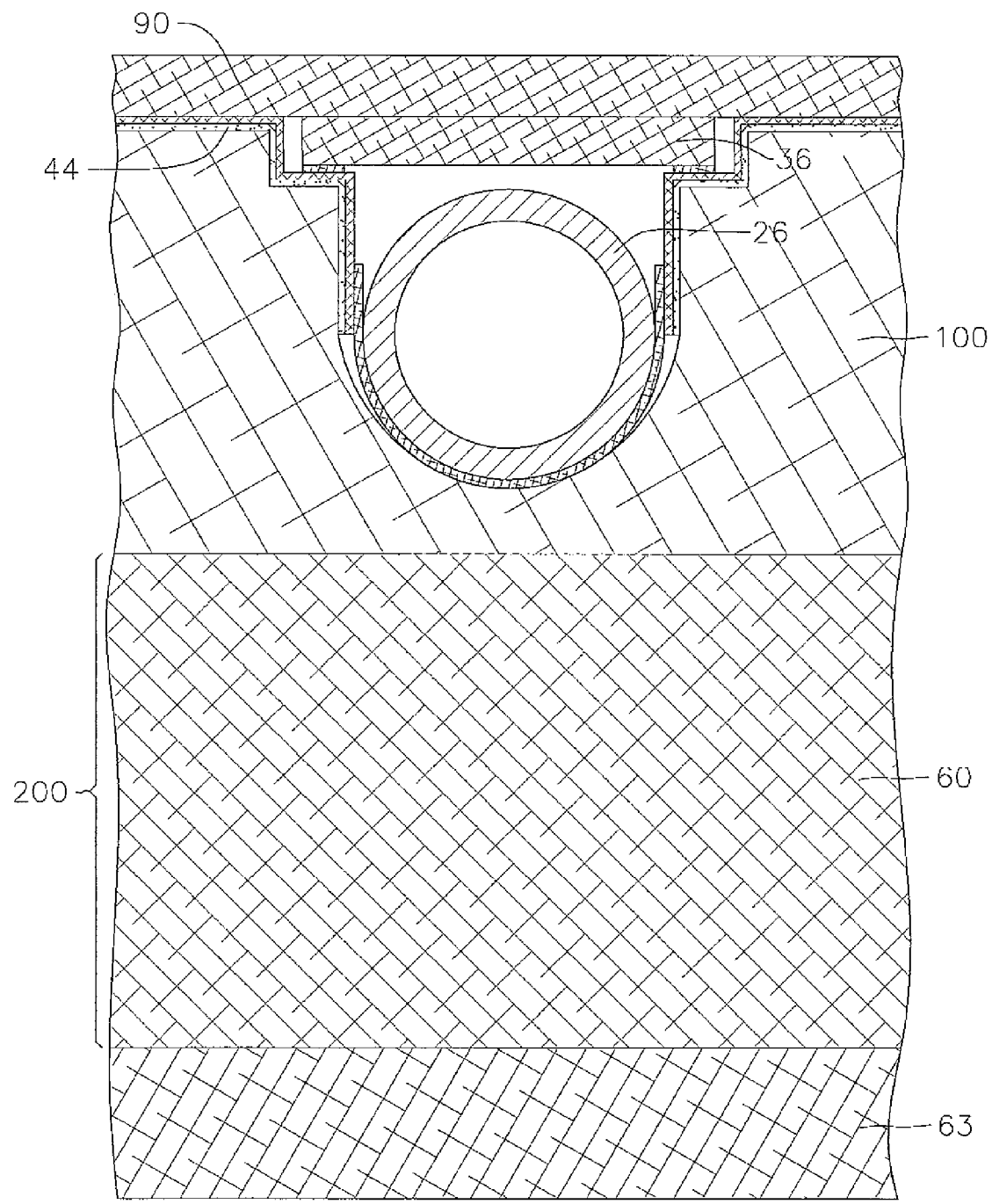
FIG. 12B is an end cross-sectional view of a sub-flooring system of the present invention, in accordance with another embodiment.
Figure 12C:
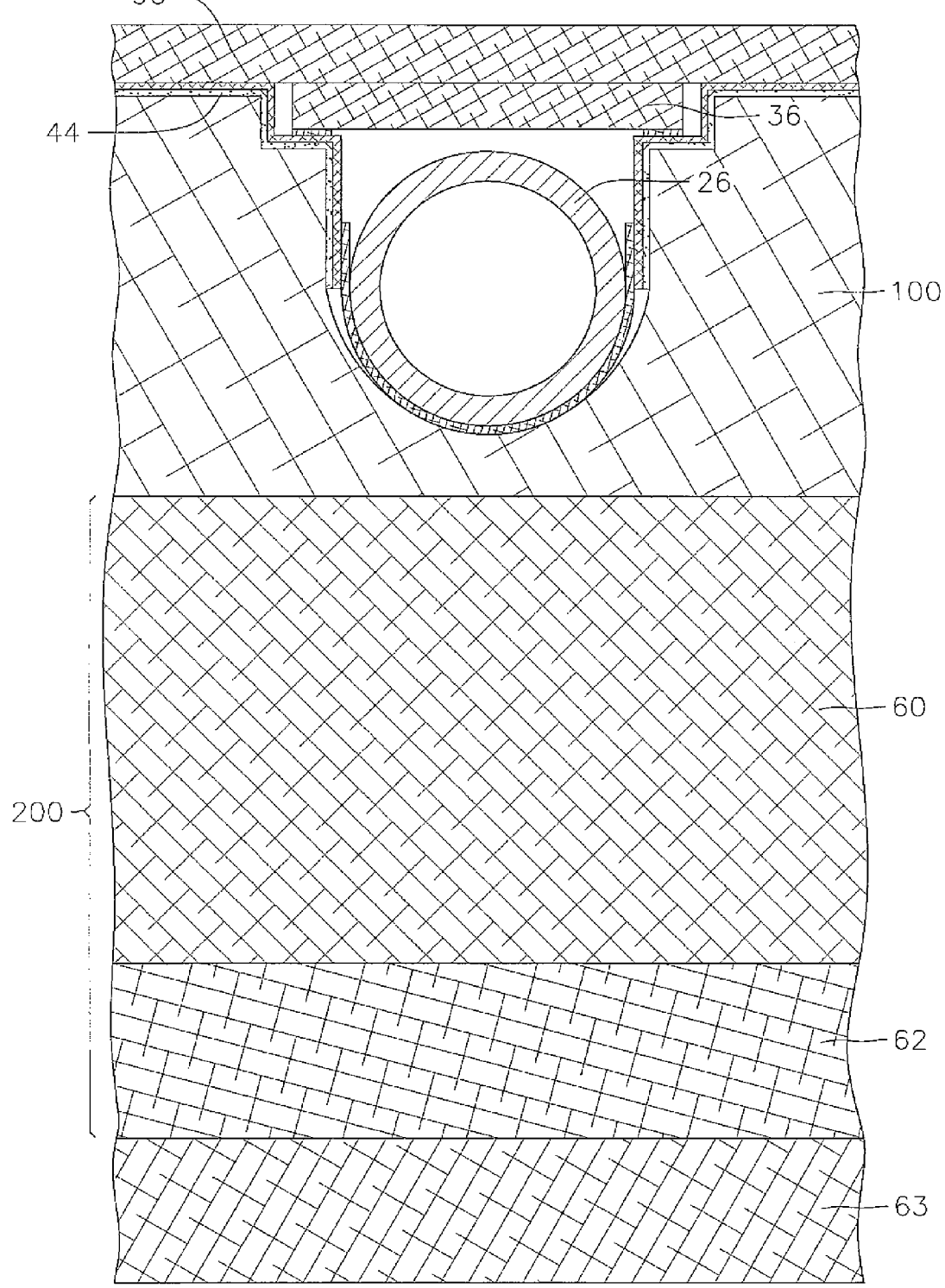
FIG. 12C is an end cross-sectional view of a sub-flooring system of the present invention, in accordance with another embodiment.

As shown in FIGS. 12A-12C, the present invention also includes an underlayment assembly 200 as part of a flooring system 300 that includes the sub-flooring panel assembly 100 and the underlayment assembly 200 installed between a slab 63 and a top finishing flooring or laminate 90. The underlayment assembly 200 includes one or more underlayment layers which are positioned between the sub-flooring panel assembly 100 and a slab 63, e.g., a concrete slab. The underlayment layers serve various functions, including impact deadening, impact sound deadening and/or sound deadening (collectively "ISD"). A suitable underlayment layer includes a layer of fiberboard 62, including natural fiberboard, as shown in FIG. 12A. The layer of fiberboard 62 may be used in place of other underlayment layer 60 (FIG. 12B) or in addition to the underlayment layer 60 (FIG. 12C). The underlayment layer 60 may include a layer of loose natural wood chips, fiber chips, or any combinations thereof.

Figure 12D:
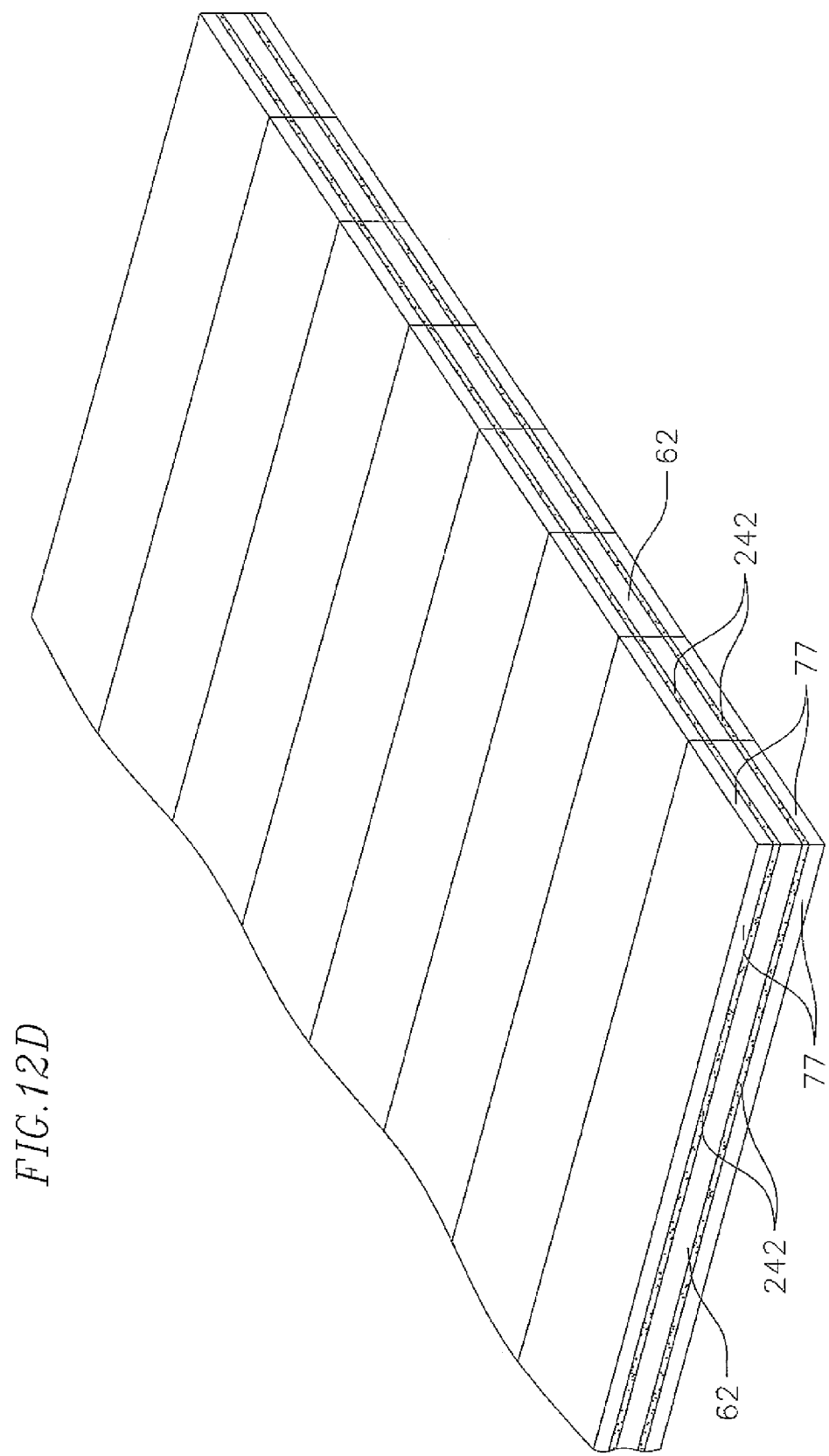
FIG. 12D is a top plan view of an underlayment assembly of the present invention, in accordance with an embodiment.

FIG. 12D illustrates one embodiment of an underlayment fiberboard layer 62 including a plurality of ISD fiberboards 62A-62I arranged side-by-side to span the room or area. Each fiberboard may be about 0.5 inches thick and its upper and lower surfaces may have ISD 77 pads or laminates affixed thereto with ISD adhesive 242 or the like. Side surfaces may be coated with a water-proofing or water-resistant sealant.

Figure 13A:
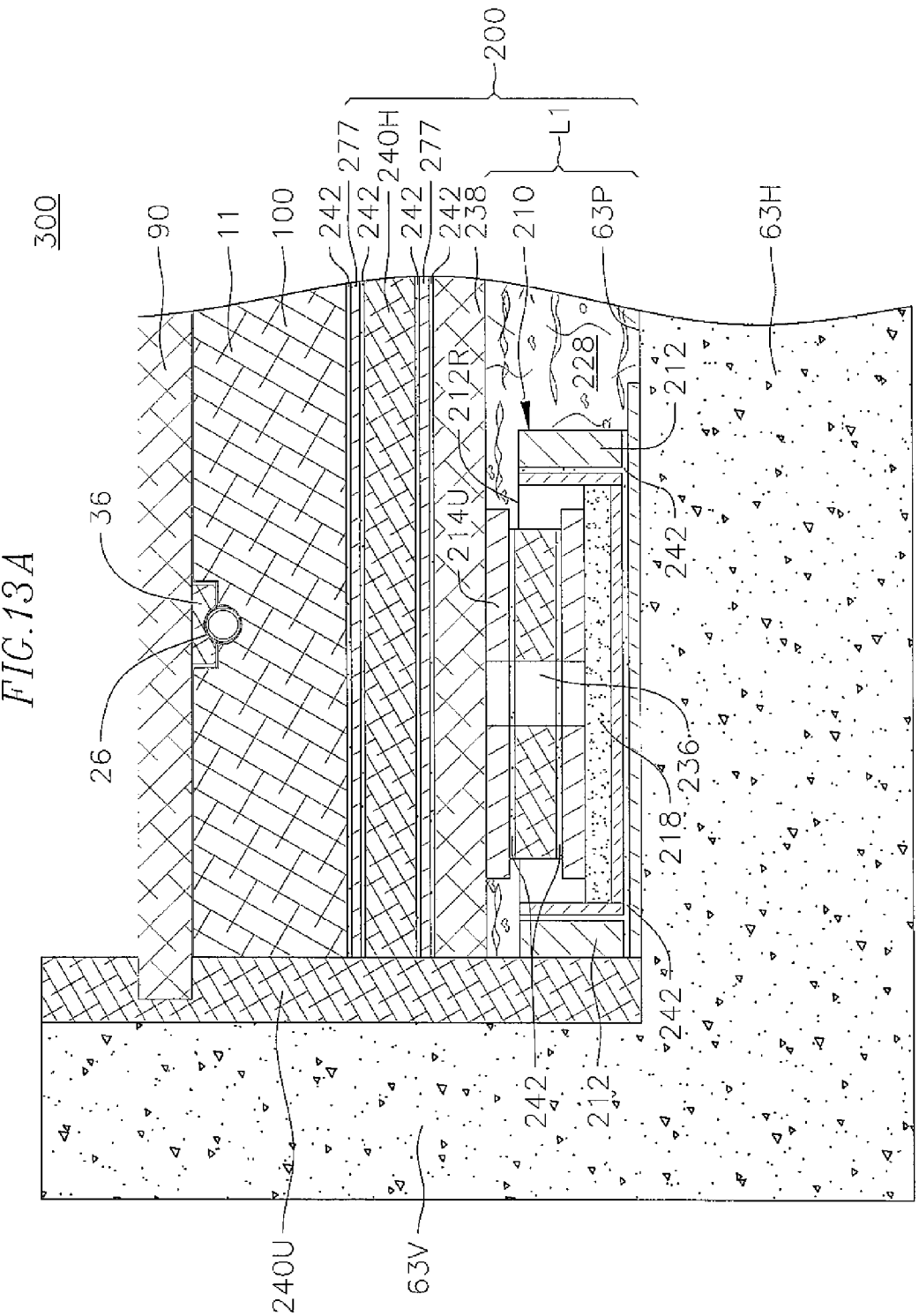
FIG. 13A is a side cross-sectional view of a periphery portion of an installed sub-flooring system of the present invention, in accordance with one embodiment.

In accordance with another embodiment of a sub-flooring system 300, the underlayment assembly 200 has a plurality of base stabilizing supports 210 and one or more underlayment layers. As shown in FIG. 13A, a sub-flooring system 300 includes the sub-flooring panel assembly 100 and the underlayment assembly 200 that are installed between a slab 63 and a top finishing flooring or laminate 90. The underlayment assembly 200 is situated between the sub-flooring panel assembly 100 and the slab 63. The slab 63 has a horizontal portion 63H and at least one vertical side portion 63V. The horizontal portion 63H provides a planar surface 63P on which the underlayment assembly 200 is assembled and supported. The vertical side portions 63V contain and support the assembly 200 on its sides.

The supports 210 are conveniently portable, repositionable and advantageously adjustable in height to serve multiple purposes and functions, including (1) leveling and stabilizing the sub-flooring panel assembly 100, especially where the slab 63 is not horizontally level, and (2) height-setting of the sub-flooring panel 100 (and hence of the finishing flooring or laminate 90). The supports also significantly increase the ISD properties of the underlayment assembly 200 by providing a stable and noncompressible layer that can both bear the weight load of the structures above while allowing the layer to be filled with a loose, volume-filling ("LVF") substance 228 with ISD properties, for example, natural fiber chips, such as wood chips and/or annually renewal fiber chips such as kenaf chips, cotton, peanut shells, rice husks, coconut husks and the like, and synthetic fibers such as fiberglass and the like, or any combinations of any or all of the foregoing. By allowing the LVF substance 228 to stay loose and fluffy, their ISD properties are maximized.

Figure 14:
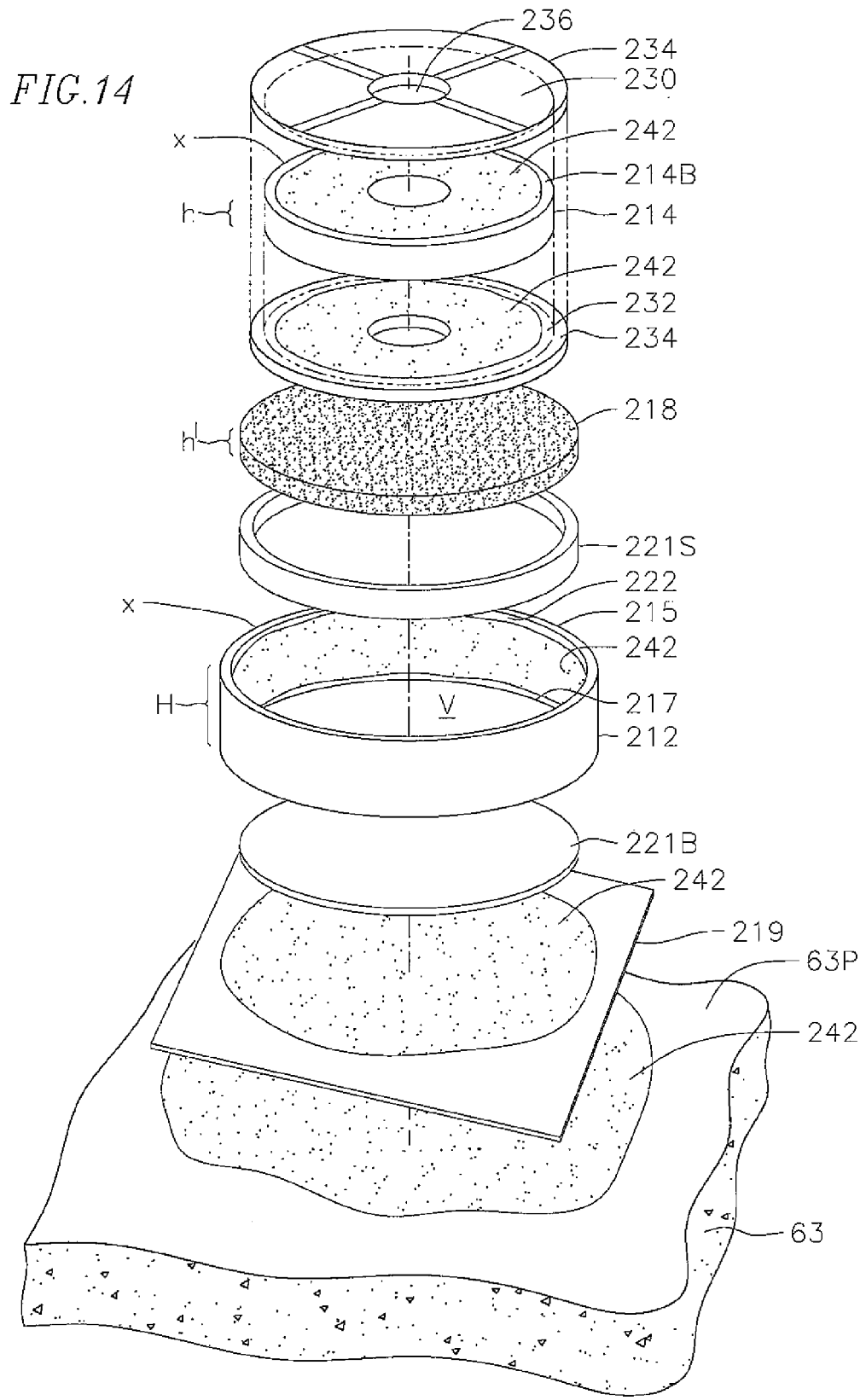
FIG. 14 is an exploded perspective view of an underlayment stabilizing support of the present invention, in accordance with one embodiment.
Figure 15:
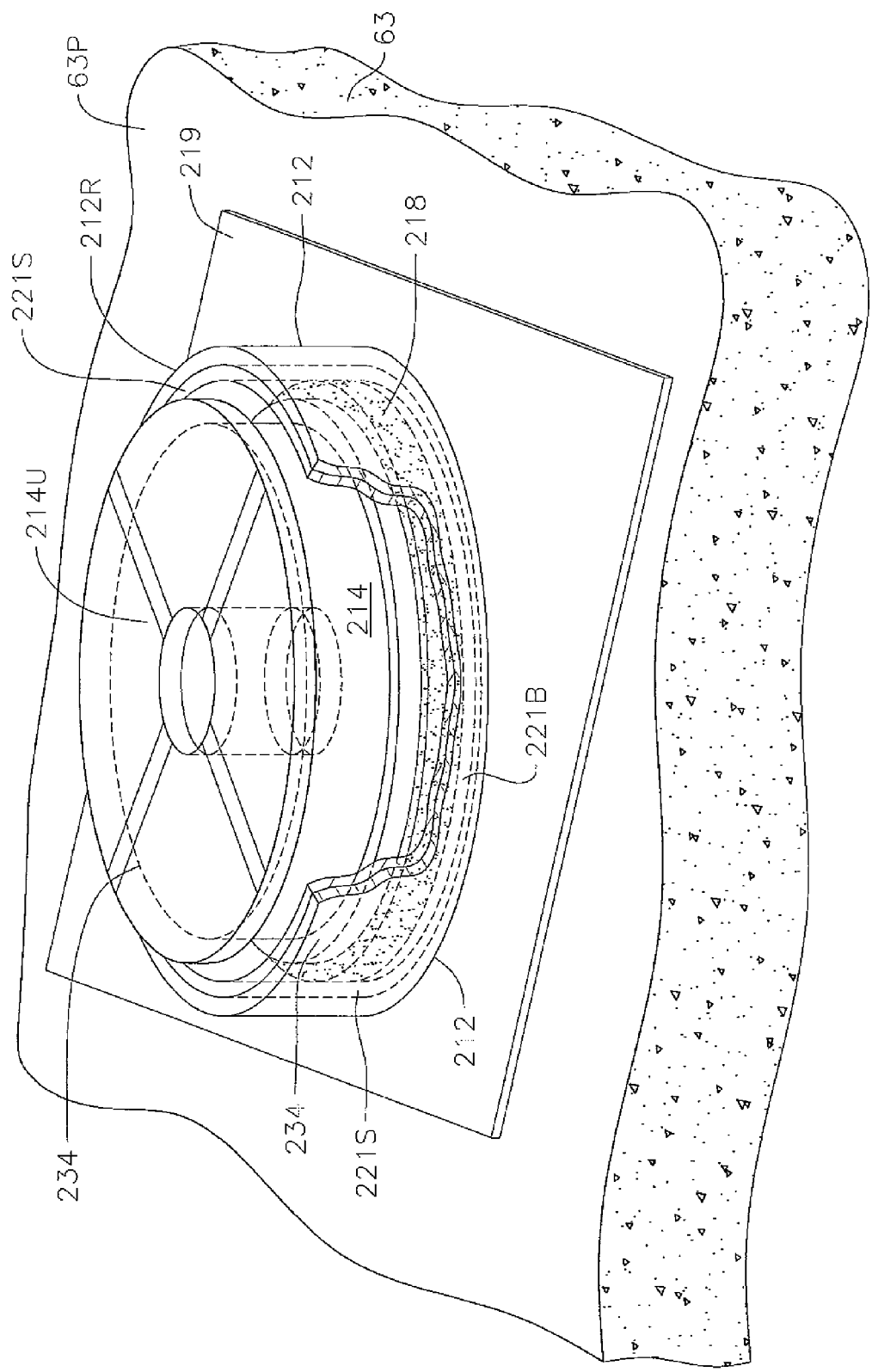
FIG. 15 is a perspective view of the stabilizing support of FIG. 14, as assembled.

As shown in the embodiment of FIGS. 14 and 15, a stabilizing support 210 has a hollow tubular (or annular) member 212 and a piston 214. The tubular member 212 is positioned on the slab 63 with its upper and lower openings 215 and 217 generally vertically aligned. The tubular member 212 may sit on an oversized ISD pad 219 that is affixed to the planar surface 63H of the slab 63 by ISD adhesive or the like (not shown). The tubular member 212 has a predefined cross-sectional pattern X and a height H. An interior volume V spans between the lower and upper openings 215 and 217.

Figure 14B:
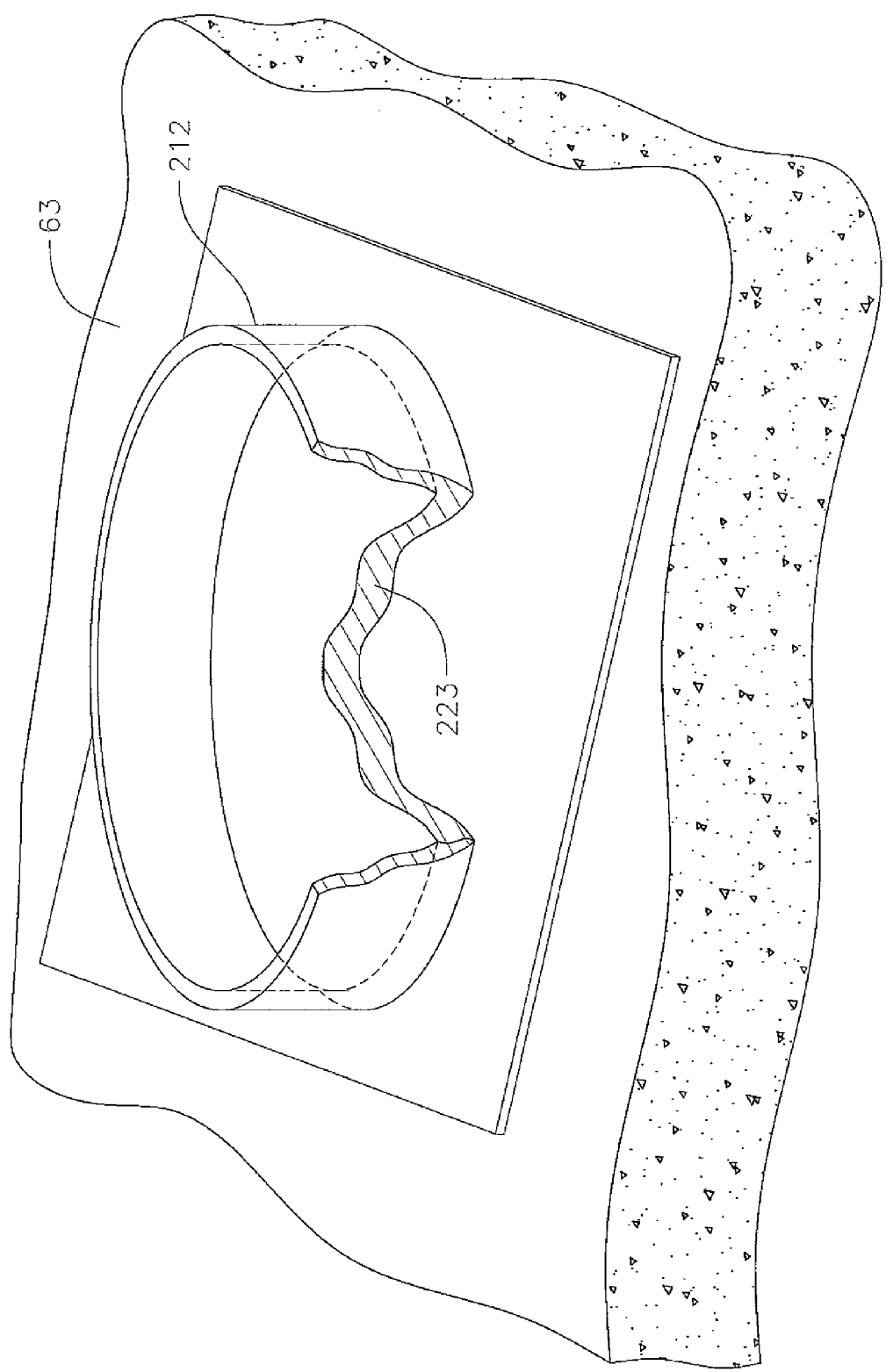
FIG. 14B is a perspective of a tubular member in accordance with yet another embodiment, with a portion broken away for clarity.

An ISD inner liner 221 is provided with a surrounding side portion 221S and a base portion 221B, where the side portion 221S lines an inner side surface 222 of the tubular member 212 and the base portion 221B seals the lower opening 217 of the tubular member 212. The ISD liner 221 is affixed to the inner side surface 222 of the tubular member 212 and an upper surface of the ISD pad 219 by ISD adhesive 242 or the like. The upper opening 215 allows communication between outside the tubular member 212 and the interior volume V, which is partially filled or occupied by a noncompressible, volume-filling particulate ("VFP") substance 218. As shown in FIG. 15, at least a lower portion of the piston 214 is inserted into the interior volume V through the upper opening 215 and the piston rests on the VFP substance 218 such that an upper surface 214U (see FIG. 13A) of the piston 14 is higher than an upper rim 212R of the tubular member 12. The lower end of the tubular member 212 may be sealed by the liner 221B, or it may be formed with a solid bottom portion 223 (see FIG. 14B). Alternatively, the bottom portion may have a grid or vane formations 220 (FIG. 14A) to minimize shifting of the VFP substance 218 in the tubular member 212. Where the tubular member 212 has a grid or vane formations 220, the depth h' of the VFP substance 218 should be greater than the height of the grid or vane formations 220 so that the surface level of the VFP substance 218 is above the formations 220.

Figure 16:
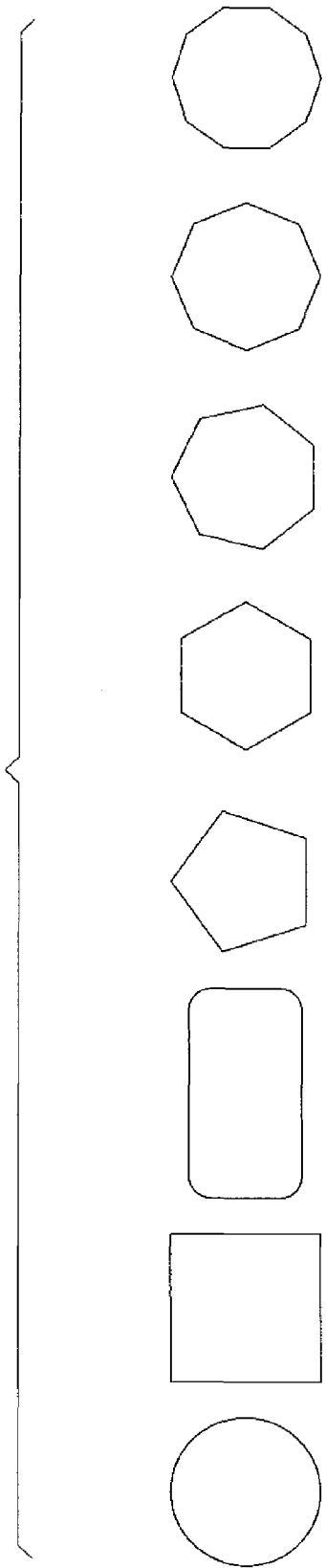
FIG. 16 illustrated suitable cross-sectional shapes for a tubular member and a piston of the stabilizing support.

As their names suggest, the ISD pad 219 and ISD liner 221 are made of any suitable material with ISD properties, for example, rubber and/or expanded polypropylene (EPP) which is an exceptionally eco-friendly, flexible and versatile plastic foam designed for lightweight, energy management and cushioning applications. The tubular member 212 is made of any suitable material that is rigid and lightweight but can bear weight and compression loads, for example, PVC, other plastics, metal, concrete, or any combinations thereof. It is understood that the cross sectional pattern X of the tubular member is not limited to a circle, but may in fact be a variety of shapes, for example, the circular and polygonal shapes shown in FIG. 16.

The volume-filling particulate ("VFP") substance 218 is pourable, spreadable and noncompressible. For example, the VFP substance 218 may be sand with sand particles having a diameter ranging from about 0.0625 mm (or $\frac{1}{16}$ mm) to 2 mm. For example, the VFP substance may be silt with silt particles having a diameter ranging from about 0.0625 mm down to 0.004 mm. It is understood that the VFP substance may include sand, silt, or any combinations thereof. It is also understood that sand, silt, or any combinations thereof, may be combined with finer gravel particles having a diameter of about 6.3 mm or less to form other suitable VFP substances.

In the illustrated embodiment of FIGS. 14 and 15, the piston 214 also has a cross-section pattern X, although it is understood that the piston 214 may have any cross-section pattern (see, e.g., FIG. 16) that allows the piston to fit within the tubular member 212. In that regard, the girth/diameter of the piston 214 is lesser than the effective inner circumference/diameter of the tubular member 212 (with or without the ISD liner 221), so that it can fit within the tubular member 212.

In the illustrated embodiment, the piston 214 includes a generally solid body 214B and it may include an upper ISD piston pad 230 and/or a lower ISD piston pad 232. The piston body 214B is constructed of any suitable material that is generally noncompressible with ISD properties and can bear significant weight and pressure loads, for example, oriented strand board (OSB), medium density fiberboard (MDF), particle board (PB), wood, plastic, concrete, or any combinations thereof. The upper and lower ISD pads 230 and 232 are affixed to upper and lower surfaces of the piston body 214B by ISD adhesive 242 or the like. As their names suggest, the upper and lower ISD pads 230 and 232 are also constructed of a material with ISD properties. The upper and lower pads have a girth/width slightly greater than that of the piston body so that a peripheral lip 234 is formed around the piston body 214B which prevents direct lateral contact between the piston body and the tubular member 212, as the present invention recognizes that direct contact between "nonISD" components may undesirably amplify impact and/or sound waves.

Figure 13B:
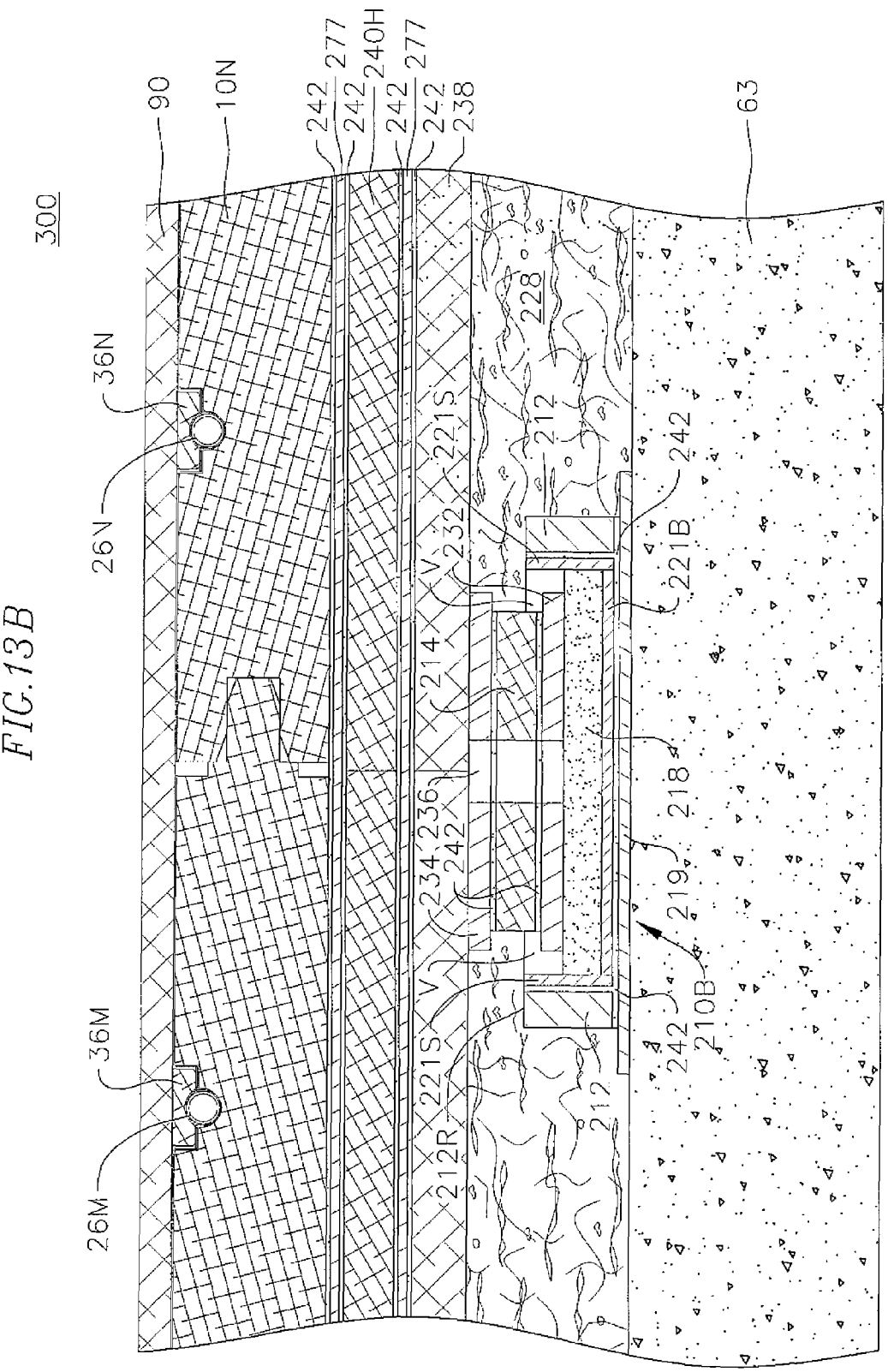
FIG. 13B is a side cross-sectional view of an interior portion of an installed sub-flooring system of the present invention, in accordance with one embodiment.

In the illustrated embodiment, the effective height h of the piston 214 (the piston body 214B with or without the upper and/or lower ISD pads 230 and 232) is also lesser than the height H of the tubular member 212, although it is understood that the height h need not be so lesser, provided the combined height of the piston body h and the height (or depth) h' of the VFP substance 218 is sufficient so that the upper surface of the piston body 214U supported on the VFP substance 218 is higher than the upper rim 212U of the tubular member 212 (see FIGS. 13A and 13B). This combined height ensures that the structure(s) on the supports 210 are not resting on the tubular member 212 but on the piston 214 to bear entire weight load. In an embodiment, the height H of the tubular member 212 and the height h of the piston 214 each ranges between about 0.5 inch and 3.0 inches, preferably between about 0.75 inches and 3.0 inches, the diameter/girth of the tubular member 212 ranges between about 6 inches and 16 inches, preferably between about 6 inches and 14 inches, more preferably about 12 inches, and the diameter/girth of the piston ranges between about 5.5 inches and 15.5 inches, preferably between about 5.5 inches and 13.5 inches, more preferably about 11.5 inches.

It is understood that one or more of the foregoing ISD pads and/or ISD liner may not be used, or that additional ISD pads or ISD liners may be used, as needed or appropriate, depending on a number of factors, including the structure of the slab 63, and the quantity and nature of underlayment layers, and/or the finishing floor 90.

Where the interior volume of the tubular member 212 (with or without the inner liner 221) is V, the portion occupied by the VFP substance 218 ranges between about 20% to 80% of V, preferably between about 30% to 70%, and more preferably about 50%. In addition to, or in lieu of the foregoing volume ratios, where the height of the tubular member 212 is H, the height h of the piston 214 ranges between about 50% to 100% of H, preferably between about 60%-80% of H, and more preferably about 75% of H. These ratios ensure that the piston 214 remains in the tubular member 212 and can properly support the structures above the supports 210. It is understood that these ratios can vary depending on the how horizontally level the slab 63 is. For example, where the slab 63 (whose left portion is shown in FIG. 13A and whose right portion is shown in FIG. 13B) is tilted with the right portion being lower than the left portion, the depth h' of the VFP substance 218 is greater in the support 210B of FIG. 13B than in the support 210A so as to offset the tilt so that any board or component resting on both supports 210A and 210B is horizontally level and balanced. It is understood that the amount of VFP substance 18 in either supports 210A or 210B can be adjusted as desired or needed to correct any tilt in the slab, or, for that matter, to introduce a tilt where the slab is horizontally level. It is also understood that the relative height difference or adjustment between the supports 210A and 210B may be accomplished through adding or removing ISD pads and/or liners, changing by adding or reducing volume of the VFP, using taller or shorter cylinder and/or using taller or shorter pistons with different heights. Any combination of these methods may also be used.

The piston 214 is configured with at least one longitudinal channel 236 extending through at least the upper ISD pad 230 and the piston body 214B. In the illustrated embodiment, the channel 236 extends also through the lower ISD pad 232. The channel serves multiple purposes and function, including use as a handhold which facilitates the insertion, placement and removal of the piston 214 from the tubular member 212. The channel 236 also advantageously allows impact and sound waves from the sub-flooring panel 10 and the finished flooring 90 above to pass through the piston 214 and be trapped and absorbed by the VFP substance 218. To that end, the piston 214 may have more than one longitudinal channel 236.

A plurality of the supports 10 are placed on the slab in selected positions relative to the sub-flooring panel assembly above it, as illustrated in FIGS. 5A and 5B. Where a plurality of sub-flooring panels 10 are arranged to provide a sub-flooring panel assembly, each subflooring panel is supported from below by at least one support 210. In the illustrated embodiment of FIG. 5A, each sub-flooring panel 10A, 10B, 10D and 10E is supported by balance board 238, and/or fiberboard 240 and at least four supports 210. Depending on the configuration of the sub-flooring panel, a given sub-flooring panel may be supported by balance board 238, and/or fiberboard 240 and/or four, five, six or seven supports. For example, the generally square sub-flooring panel 10B is supported by at least four supports 210B, with each under and near a respective corner of the sub-flooring panel 10B. A fifth support 210B' may be placed under a noncorner edge region under or near corners of adjacent sub-flooring panels. Each of rectangular sub-flooring panels 10A, 10D and 10E is supported by at least four supports. For example, an interior rectangular panel 10Ai is supported by four supports 210A, one under each corner, and at least fifth and sixth supports are placed below those panels' noncorner edge regions, under or near corners of adjacent sub-flooring panels. For peripheral panels 10Ap, a support 210B is under each corner, at least a fifth support 210A' is placed under a noncorner edge and at least a sixth support 210A" is placed under or near corners of adjacent panels. For peripheral rectangular sub-flooring panels 10D and 10E along a periphery of the sub-flooring panel assembly, a support 210D or 210E is under each corner, at least fifth supports 210D' and 210E' are placed under a noncorner edge, and at least sixth and seventh supports 210D" and 210E" are placed under or near corners of adjacent sub-flooring panels. Accordingly, in the illustrated embodiment of FIG. 5A, any given support 210 may partially support and be under one sub-flooring panel 10 (see support 210X), two adjoined corners of two adjacent sub-flooring panels (see support 210Y), or two adjoined corners of two adjacent sub-flooring panels along with an adjoined length edge of a third adjacent sub-flooring panel (see support 210Z). Thus, any given support 210 partially supports up to three sub-flooring panels 10 and any sub-flooring panel 10 is supported by no less than four supports 210. In the illustrated embodiment of FIG. 5B, any given support 210 may partially support and be under one sub-flooring panel (see support 210X), two adjoined corners of two adjacent sub-flooring panels (see support 210Y), two adjoined corners of two adjacent sub-flooring panels along with an adjoined length edge of a third adjacent sub-flooring panel (see support 210Z), or four adjoined corners of four adjacent sub-flooring panels (see support 210W).

In the illustrated embodiment of FIG. 13A, the layers of the underlayment assembly 200 include at least a bottom layer of loose volume filler ("LVF") substance 228 generally coextensive with the supports 210, a generally rigid board 238 that is balanced on and directly supported from below by the supports 210, and a fiberboard 240H above the generally rigid "balance" board 238. The underlayment layers may also include a plurality of vertical side fiberboards 240V that line the vertical side portions of the slab 63. The LVF substance 228 is generally vertically and horizontally coextensive with the supports 210 in that the LVF substance occupies generally the same layer L1 of the underlayment assembly 200 occupied by the supports 210, filling in the space horizontally around the between the supports 210 and vertically between the slab 63 and the balance board 238. The balance board 238 is made of any suitable noncompressible material that can bear the weight and pressure load from the structures above it, including, for example, oriented strand board (OSB), medium density fiberboard (MDF), particle board (PB), wood, plastic, concrete, or any combinations thereof. The horizontal and vertical fiberboards 240H and 240V are made of any suitable material, including, for example, natural fiberboard, of new and/or recovered fibers, preferably organically produced. Between the sub-flooring panel assembly 10 and the balance boards 238, each fiberboard 240H has an ISD pad 277 on its upper and lower surface which may be applied as a laminate with the use of a coating or layer of ISD adhesive 242 or the like. Another coating or layer of ISD adhesive 242 or the like affixes the upper ISD pads 277 and the sub-flooring panel assembly 100, and another coating of layer of ISD adhesive 242 or the like affixes the lower ISD pads 277 and the balance boards 238. As mentioned above, the present invention recognizes that ISD properties are improved where there is minimal direct contact between "nonISD" materials that have little or no ISD properties. In the illustrated embodiment, ISD materials separate the finishing flooring 90 and the slab 63, including separation of the supports 210 and the slab 63 by the ISD base pad 219, and separation of the supports 210 and the balance board 238 by the ISD upper pad 230. A coating of water-proof sealant may be applied to the outer surfaces of the balance board 238 and/or the fiberboards 240H and 240V as needed or desired.

Figure 17:
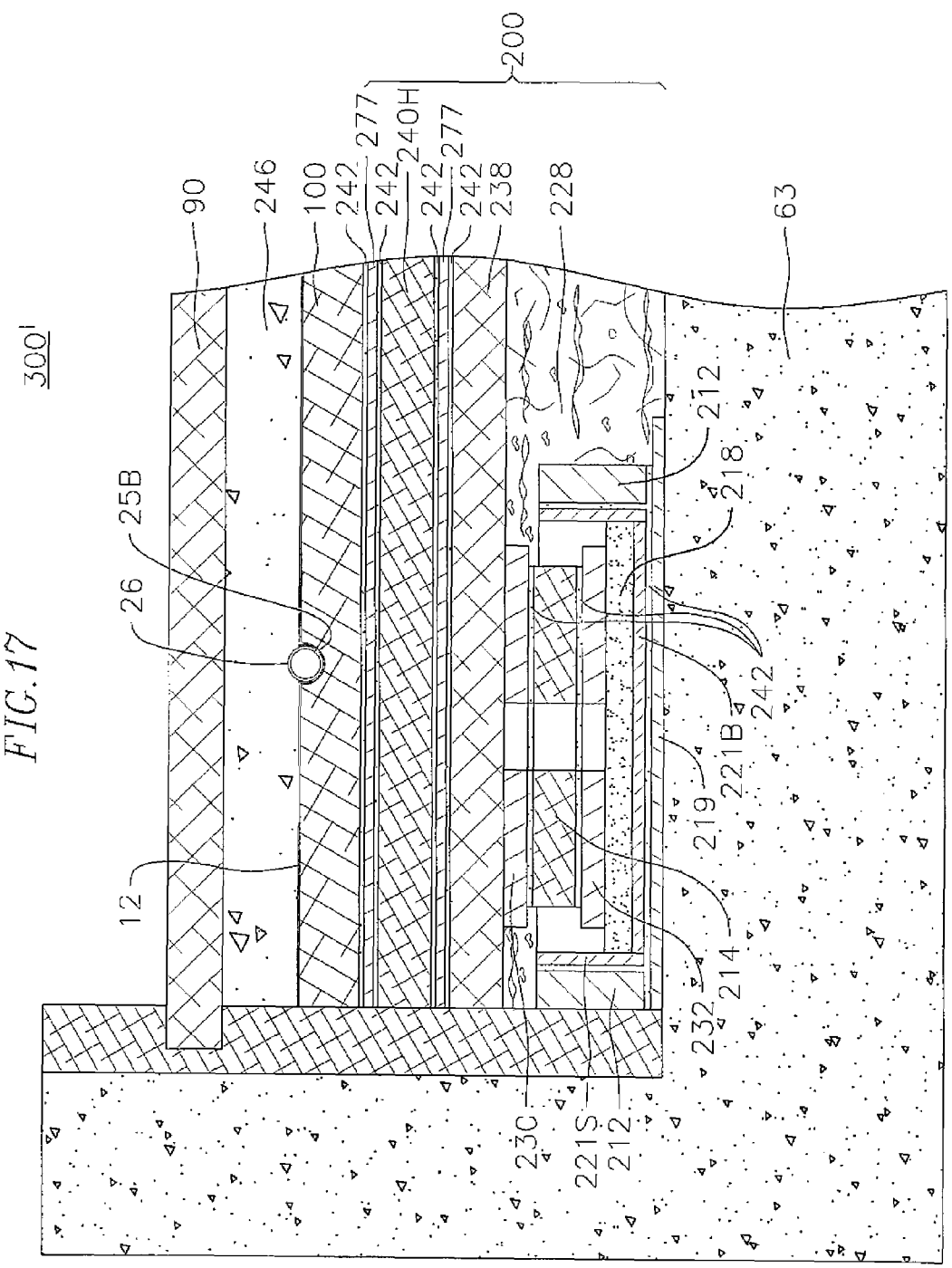
FIG. 17 is a side cross-sectional view of a periphery portion of an installed sub-flooring system of the present invention, in accordance with another embodiment.

In another embodiment as illustrated in FIG. 17, the underlayment layers of the underlayment assembly 200 include a "loose" cement or mortar layer 246 between the finishing flooring 90 and the sub-flooring panel assembly 100. As shown, the groove 24 is shallower with only the bottom portion 25B of the trough 25 receiving the piping 26, wherein an upper portion of the piping extends above the upper surface 12 of the sub-flooring panel assembly 100. Accordingly, as mortar is poured onto the sub-flooring panel assembly 100, the mortar layer 246 is formed with a recess on its lower surface which encases the piping. It is understood that TC liners may be provided over and/or under the piping 26 and on the upper surface 12 of the subflooring panels as needed or desired prior to the mortar being poured.

Installation and Assembly

For a room or an area to be covered by the sub-flooring panel assembly, a slab 63 is provided, on which one or more layers of ISD underlayment are installed. In the embodiments of FIGS. 12A, 12B, 12C and 12D, a fiberboard 62 and/or an underlayment layer 60 may be placed on the slab 63, followed by the installation of a plurality of sub-flooring panels 10 joined together to form a sub-flooring panel assembly 100. The panels 10 are laid so that the piping grooves 24 of adjacent panels are aligned and the piping grooves form a continuous overall groove pattern G that spans the room or area and is adapted to receive at least one continuous elongated piping 26 (see FIGS. 5A and 5B). Any inlet groove 24I and outlet groove 24O continuous with the pattern G are formed in a selected sub-flooring panel of the sub-flooring assembly 100 to provide ingress and egress of the piping 26 in and out of the room or area.

Each panel 10 may already have an overlying TC liner 32 (with perforations 61) affixed or laminated to the upper surface 12 (see FIG. 1A) prior to installation or being joined with other panels 10. Alternatively, larger sheets of TC liners 32 may be applied to yet unlined panel bodies 11, for example, covering rows or columns of the sub-flooring panels 10. Any other underlying or overlying TC liners 30 and 35 may be wrapped onto the piping 26. For example, a TC liner may be formed as an elongated sleeve that is slipped onto the piping 26. The piping 26 is then laid out onto the assembly 100 tracing the pattern G (as visually indicated by the perforations 61 above the grooves 24) and pushed downwardly to tear through the perforations and drop into the groove 24. Inspections and adjustments are made to ensure the piping 26 has dropped completely into the trough 25 of the groove 24 and is in contact directly with the TC liner 32 or indirectly via TC liners 30 and 35 where the liners are overlapping or at least in contact with each other.

Elongated linear and curved strips of cap members 36 are then placed so that each groove 24 along the entirety of the pattern G, whether or not a segment of the piping 26 is in the groove, is covered and the piping below protected, taking care to avoid tearing or otherwise damaging the TC liners. Finishing flooring or laminates 90 are then installed above the sub-flooring panel assembly 100.

In another embodiment where supports 210 are used, the supports 210 are placed in selected locations on the slab 63. A "map," for example, the top plan views of FIG. 5A or 5B, may be provided showing the layout of the sub-flooring panels, including the "seams" or lateral gaps 55 between adjacent sub-flooring panels 10. The locations of panel corners (intersections of the seams or gaps) can be visually indicated and marked on the upper surface of the slab 63. A support 210 is placed at each "corner" location. Additional the supports 210 may be positioned, for example, in noncorner locations along the periphery of the room or area. As described above, a support 210 may be placed under a side edge of a sub-flooring panel or under at least two adjoined corners of two adjacent sub-flooring panels, where each corner covers generally a quadrant of the cross sectional area of the piston 214 of the support 210.

To assemble and install a support 210, adhesive 242 is applied to the upper surface 63P of the slab at the selected location. Where the ISD base pad 219 is used, it is placed on the adhesive and affixed to the selected location. Adhesive 242 is applied to the upper surface of the ISD base pad 219 and the tubular member 212 is affixed thereto. Where the ISD liners 221B and 221S are used, adhesive 242 is applied to the inner surface 222 of the tubular member 212. The liners 221B and 221S are placed inside the tubular member 212 to line the interior volume V. It is understood that the liners 221B and 221S can be affixed to the tubular member 212 prior to installation.

The piston 214 may be assembled prior to insertion into the tubular member 214. The upper and lower pads 230 and 232 are affixed to the piston body 214B by adhesive 242. The pads are arranged relative to the piston body 214B in a manner whereby the channel 236 is aligned and the lips are provided in the periphery of the upper and lower pads 230 and 232.

During or after placement of all the tubular members 212 on the slab 63, the VFP substance 218 is poured or otherwise placed each tubular member 212 (the VFP substance 218 should be of a depth to at least cover any vane formations or grid formation 220). The piston 214 in each tubular member 212 is positioned to rest on the VFP substance 218. A measurement or assessment is made as to the effective height of the upper surface of each piston 214 (with or without upper ISD pad 230). Adjustments are made as needed so that each piston 214 is at a desired height, for example, where the upper surface of all pistons are above the upper rims of their respective tubular member and the upper surfaces of all pistons are at the identical altitude relative to ground (or the identical height from ground). Height adjustments may be made by, for example, by changing (increasing or decreasing) the amount of VFP substance 218 in the tubular member 212, removing or adding ISD pads, and/or replacing with a taller or shorter piston 214. After the desired height(s) are obtained, the spaces around and between the supports 210 are filled with LVF substance 228.

For another underlayment layer, a plurality of balance boards 238 are laid on the supports 210. Where balance boards 238 and fiberboards 240H are about the same sizes and shapes as the sub-flooring panels 10 for forming the sub-flooring panel assembly 100, the balance boards 238 and/or the fiberboards 240H may be installed in the same layout pattern as the sub-flooring panels. As shown in FIG. 13B, support 210B is positioned below corner regions of the panels 210N and 210M, balance boards 238N and 238M and fiberboards 240N and 240M. However, where the balance boards 238 and/or fiberboards 240 have different sizes and/or shapes from the sub-flooring panels 10, any two or more of these layers may be arranged and laid in a different layout pattern than the panel assembly 100. For example, any two or more of these layers may be arranged in "criss-crossing" patterns, such that their respective seams or lateral gaps are not vertically aligned between any two adjacent layers. For example, the balance boards 238 may be laid with their longitudinal axis along a first direction and the fiberboards 240 may be laid above with their longitudinal axis along a second direction angularly offset (e.g., about 45-90 degrees) from the first direction. Moreover, additional supports 210 may be used to be positioned under corner regions of the balance boards, fiberboards and/or elsewhere as needed or desired. As shown in FIGS. 14 and 15, placement of structures, for example, corners of the balance boards 238, on the supports 210 may be guided by visual indicators 247, such as quadrant markers, provided on the piston, for example, the upper surface of the upper ISD pad 230.

After each of the balance boards 238 is laid on the supports 210, each is fastened to the supports 210 below it, for example, by fasteners, such as screws, nails or the like, driven through the balance boards and into at least the upper ISD pad 230, the piston body 214B and perhaps into the LVF particulate substance 218. The fiberboards 240 may also be fastened to the supports 210 in the same manner, either separately or simultaneously with the balance boards 238. As shown in FIGS. 13A and 13B, a layer of ISD adhesive 242 or the like may be applied to the upper surface of the balance boards 238 before the fiberboards 240 are installed above the balance boards 238, and also applied to the upper surface of the fiberboards 240.

Above the underlayment assembly 200, the sub-flooring panels 10 may be arranged, joined, and laid in any manner depending on a number factors, including the shape and size of the room or area to receive the sub-flooring system 300, and the layout pattern(s) of the fiberboards and the balance boards below it. For example, sub-flooring panels 10D and 10E are arranged and joined along two opposing peripheral edges of the room and area and sub-flooring panels 10A, 10B and/or 10C are arranged and joined for the interior of the room or area. The grooves 24 of adjacent sub-flooring panels are align and connected to form a continuous groove having a pattern G with a generally serpentine portion GS, a linear traversing portion GL, an inlet 24I and an outlet 24O, as shown in FIGS. 5A and 5B.

The piping 26 may be laid in the manner as described above. The strips of cap members 36 may be placed in the grooves 24 in the manner described above. Likewise, the finishing flooring or laminate 90 may be installed on the sub-flooring panel assembly. Finishing flooring or laminate may include, for example, laminated engineered wood flooring, hardwood flooring, tile or linoleum flooring.

As mentioned above, the cap members are preferably installed in each groove whether or not it contains the piping or any other elements. The protective cap member protect the piping and provides a smooth and even surface ready for installation of finishing flooring above the sub-flooring panel assembly.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention. In that regard, the drawings are not necessarily to scale. Any feature of any embodiment may be used in combination with any feature of any other embodiment, as needed or desired. It is understood that an electronic heating and/or cooling element may be used in lieu of or in addition to the piping. For example, an electronic heating wire or cord may be placed in the groove of the sub-flooring panel in lieu or in addition to the piping. Accordingly, the foregoing description should not be read as pertaining only to the precise structures described and illustrated in the accompanying drawings, but rather should be read consistent with and as support to the following claims which are to have their fullest and fair scope.

What is claimed is:

1. A sub-flooring panel for use with a heating element comprising:
    a first solid base body having a first recessed formation adapted to receive the heating element, the first recessed formation having:
        a bottom portion having a semi-circular cross-section with a first diameter; and
        opposing step formations, each step formation having a rise and a run, the rises of the opposing step formations being separated by a second distance greater than the first diameter;
    a cap member having flat side portions, each flat side portion supported on a respective run of the opposing step formations, the cap member configured to cover the heating element in the first recessed formation, the cap member having a second recessed formation adapted to receive a portion of the heating element; and
    at least one thermally-conductive liner configured for contact with both the heating element and the first solid base body, the liner having at least a first portion and a second portion, the first portion positioned between the heating element and the second recessed formation of the cap member, the first portion of the liner generally conforming to the second recessed formation of the cap member, the second portion of the liner positioned between each of the flat side portion and its respective opposite step formation.

2. The panel of claim 1, wherein the first base body comprises a material selected from the group consisting of oriented strand board (OSB), plywood, medium density fiberboard (MDF), particleboard, pre-fabricated agricultural residues, wood, pre-fabricated "light" concrete, plastics or a combination thereof.

3. The panel of claim 1, wherein the recessed formation has a step formation on which the cap member is supported.

4. The panel of claim 3, wherein the step formation has at least one beveled corner.

5. The panel of claim 1, wherein the heating element includes hydronic piping.

6. The panel of claim 1, wherein liner comprises aluminum, and/or copper.

7. The panel of claim 1, wherein the liner has a perforation pattern.

8. The panel of claim 1, further comprising at least one connector configured to connect the first base body to another base body of another sub-flooring panel.

9. The panel of claim 8, wherein the another base body has another recessed formation, and wherein the another recessed formation is configured for alignment with the first recessed formation.

10. The panel of claim 9, wherein each recessed formation is configured to receive a respective portion of the heating element.

11. The panel of claim 1, wherein the cap member has at least one beveled corner.

12. A sub-flooring system, comprising:
a sub-flooring panel assembly comprising a plurality of panels, each panel comprising a solid base body with a recessed formation, wherein the recessed formations of at least two panels are aligned and configured to receive an elongated heating element, and wherein each recessed formation has a bottom portion having a semi-circular cross-section with a first diameter, and opposing step formations, with each step formation having a rise and a run, the rises of the opposing step formations being separated by a second distance greater than the first diameter;
a cap member configured to sit in at least one recessed formation and cover at least a portion of the elongated heating element, the cap member having a concave form configured to receive an upper portion of the portion of the elongated heating element; and
an underlayment assembly comprising a plurality of stabilizing supports and at least one generally rigid board.

13. The sub-flooring system of claim 12, wherein each panel has at least a connector configured to connect adjacent panels to each other.

14. The sub-flooring system of claim 12, wherein the elongated heating element includes hydronic piping.

15. A method of installing a sub-flooring system, comprising:
providing a slab structure;
positioning at least two stabilizing supports on the slab structure, each in a selected location;
positioning at least one generally rigid board on the supports;
providing a plurality of solid sub-flooring panels, each panel having a recessed formation, the recessed formation having:
a bottom portion having a semi-circular cross-section with a first diameter; and
opposing step formations, each step formation having a rise and a run, the rises of the opposing step formations being separated by a second distance greater than the first diameter;
joining the plurality of panels to form a sub-flooring panel assembly wherein the recessed formations of adjacent panels align with each other to form an elongated continuous recessed formation;
positioning an elongated heating element in the elongated continuous recessed formation;
positioning a thermally-conductive liner on at least a portion of the elongated heating element, the liner having a recessed formation conforming to an upper portion of the elongated heating element; and
positioning a cap member in the elongated continuous recessed formation on at least a portion of the liner to cover at least a portion of the elongated heating element, the cap member having flat side portions, each flat side portion supported on a respective run of the opposing step formations, the cap member having a recessed formation configured to receive an upper portion of the elongated heating member.

16. The method of claim 15, wherein a selected location is generally under a corner region of at least one panel.

17. The method of claim 15, wherein the positioning at least two stabilizing supports includes adjusting height of at least one of the stabilizing supports.

18. The method of claim 15, further comprising positioning a fiberboard on the at least one generally rigid board before positioning the panels on the fiberboard.

* * * * *